(12) United States Patent  
Takeuchi et al.

(10) Patent No.: US 11,089,326 B2  
(45) Date of Patent: Aug. 10, 2021

(54) MOVING IMAGE ENCODING DEVICE, MOVING IMAGE ENCODING METHOD, MOVING IMAGE DECODING DEVICE, AND MOVING IMAGE DECODING METHOD

(71) Applicant: FUJITSU LIMITED, Kawasaki (JP)

(72) Inventors: Kenshiro Takeuchi, Kawasaki (JP); Guillaume Denis Christian Barroux, Kawasaki (JP); Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/842,151

(22) Filed: Apr. 7, 2020

(65) Prior Publication Data

US 2020/0236393 A1    Jul. 23, 2020

Related U.S. Application Data

(63) Continuation of application No. PCT/JP2017/038062, filed on Oct. 20, 2017.

(51) Int. Cl.
*H04N 19/52* (2014.01)
*H04N 19/176* (2014.01)
(Continued)

(52) U.S. Cl.
CPC .......... *H04N 19/52* (2014.11); *H04N 19/119* (2014.11); *H04N 19/176* (2014.11); *H04N 19/96* (2014.11)

(58) Field of Classification Search
CPC .... H04N 19/176; H04N 19/96; H04N 19/119; H04N 19/52; G06T 5/50; G06T 9/40
See application file for complete search history.

(56) References Cited

U.S. PATENT DOCUMENTS

2011/0103701 A1*  5/2011  Cheon .................. H04N 19/395  
                                                            382/233
2012/0128067 A1  5/2012  Liu et al.
(Continued)

FOREIGN PATENT DOCUMENTS

JP  2010-193401 A  9/2010
JP  2011-223303 A  11/2011
(Continued)

OTHER PUBLICATIONS

Extended European Search Report dated Jul. 3, 2020 for corresponding European Patent Application No. 17929190.1, 8 pages.
(Continued)

*Primary Examiner* — Obafemi O Sosanya
(74) *Attorney, Agent, or Firm* — Fujitsu Patent Center

(57) ABSTRACT

A moving image encoding device includes a memory, and a processor coupled to the memory and configured to partition a picture edge block into sub-blocks so that none of the sub-blocks include an edge of a picture by partitioning the picture edge block into four or two, the picture edge block being a block including a horizontal or vertical edge of the picture among blocks of the picture, generate a prediction block by referring to another encoded picture or an encoded area of the picture for each of the sub-blocks, calculate a prediction error between a pixel of a given sub-block and a corresponding pixel of the prediction block corresponding to the given sub-block for each of the sub-blocks and encode the prediction error, and add partitioning information indicating whether the picture edge block has been partitioned into four or two, to encoded moving image data.

8 Claims, 12 Drawing Sheets

(51) Int. Cl.
*H04N 19/96* (2014.01)
*H04N 19/119* (2014.01)

(56) References Cited

U.S. PATENT DOCUMENTS

| | | | |
|---|---|---|---|
| 2013/0003842 A1 | 1/2013 | Kondo | |
| 2013/0077885 A1 | 3/2013 | Wang et al. | |
| 2016/0373766 A1 | 12/2016 | Fuldseth et al. | |
| 2017/0208336 A1 | 7/2017 | Li et al. | |
| 2017/0272750 A1* | 9/2017 | An | H04N 19/147 |
| 2019/0075328 A1 | 3/2019 | Huang et al. | |

FOREIGN PATENT DOCUMENTS

| | | |
|---|---|---|
| JP | 2013-509788 A | 3/2013 |
| JP | 2013-544061 A | 12/2013 |
| WO | 2011/086964 A1 | 7/2011 |
| WO | 2017157249 A1 | 9/2017 |

OTHER PUBLICATIONS

Jianle Chen et al., "Algorithm Description of Joint Exploration Test Model 7 (JEM7)", Joint Video Exploration Team (JVET) of ITU-T SG 16 WP 3 and ISO/IEC JTC 1/SC 29/WG 11, Doc: JVET-G1001-v1, Jul. 13-21, 2017, pp. 2-3 in particular, section 2.1.1 (last paragraph on p. 2), Figure 1 (Total 5 pages) (Cited in ISR for No. PCT/JP2017/038062).

Jaeil Kim et al., "Enlarging MB Size for High Fidelity Video Coding Beyond HD", ITU—Telecommunications Standardization Sector Study Group 16 Question 6, Video Coding Experts Group (VCEG), Doc: VCEG-AJ21, Oct. 8-10, 2008, pp. 1-6 (Total 6 pages) (Cited in ISR).

Fuzheng Yang et al., "CTB Splitting on Frame Boundary for Arbitrary Resolution Video", Joint Collaborative Team on Video Coding (JCT-VC) of ITU-T SG16 WP3 and ISO/IEC JTC1/SC29/WG11, Doc: JCTVC-C025, Oct. 7-15, 2010, pp. 1-4 (Total 5 pages) (Cited in ISR).

Recommendation ITU-T H.265 (ISO/IEC 23008-2), "High Efficiency Video Coding", Series H: Audiovisual and Multimedia Systems, Infrastructure of Audiovisual Services—Coding of Moving Video, Apr. 2013 (Total 317 pages).

An et al, "Block Partitioning Structure for Next Generation Video Coding", ITU-T SG16, Study Group 16—Contribution 966 R3, Doc: COM 16-C966 R3-E, pp. 1-8, Sep. 2015 (Total 8 pages).

International Search Report and Written Opinion of the International Searching Authority (Form PCT/ISA/210 and 237), mailed in connection with PCT/JP2017/038062 dated Nov. 28, 2017 (Total 13 pages).

INOA—Office Action dated Apr. 7, 2021 issued with respect to the corresponding Indian Patent Application No. 202037013779.

CAOA—Office Action dated May 21, 2021 issued with respect to the corresponding Canadian Patent Application No. 3,078,905.

JPOA—Office Action dated Jun. 8, 2021 issued with respect to the corresponding Japanese Patent Application No. 2019-549088 with full machine translation.

* cited by examiner ced area of a picture to be encoded. The inter prediction encoding method is an encoding method generating a prediction block by referring to a reference picture (which is

MOVING IMAGE ENCODING DEVICE, MOVING IMAGE ENCODING METHOD, MOVING IMAGE DECODING DEVICE, AND MOVING IMAGE DECODING METHOD

CROSS-REFERENCE TO RELATED APPLICATION

This application is a continuation application of International Application PCT/JP2017/038062 filed on Oct. 20, 2017 and designated the U.S., the entire contents of which are incorporated herein by reference.

FIELD

The present disclosure relates to, for example, a moving image encoding device, a moving image encoding method, and a non-transitory computer-readable storage medium for storing a moving image encoding computer program, which encode moving image data, and a moving image decoding device, a moving image decoding method, and a non-transitory computer-readable storage medium for storing a moving image decoding computer program, which decode encoded moving image data.

BACKGROUND

Generally, moving image data has a significantly large amount of data. Thus, a device handling moving image data compresses moving image data by encoding when the device is sending moving image data to another device or when the device is storing moving image data in a storage device. As a representative moving image encoding standard, Advanced Video Coding (MPEG-4 AVC or ITU-T H.264) and High Efficiency Video Coding (HEVC or ITU-T H.265) have been developed (for example, see Non Patent Document 1).

In such an encoding standard, a picture to be encoded is partitioned into blocks. For each block to be encoded, a prediction block is generated from another picture already encoded or an area already encoded in the picture to be encoded, and redundancy is removed by encoding a difference between the block to be encoded and the prediction block.

For example, each picture included in moving image data is partitioned at multiple stages in HEVC. First, partitioning of a picture in HEVC will be described.

FIG. 1 is a drawing illustrating an example of partitioning a picture in HEVC. As illustrated in FIG. 1, a picture 100 is partitioned by a coding tree unit (CTU) (which is also called a largest coding unit (LCU)) that is a unit for an encoding process. Each CTU 101 is encoded in the order of raster scanning. The size of the CTU 101 can be selected from 16×16 to 64×64 pixels.

The CTU 101 is further partitioned into multiple coding units (CUs) 102 using a quadtree structure. Each of the CUs 102 in one CTU 101 is encoded in the z-scan order. The size of the CU 102 is variable and the size is selected from 8×8 to 64×64 pixels of a CU partitioning mode. The CU 102 is a unit for selecting the intra prediction encoding method or the inter prediction encoding method, which are encoding modes. The intra prediction encoding method is an encoding method generating a prediction block by referring to an encoded area of a picture to be encoded. The inter prediction encoding method is an encoding method generating a prediction block by referring to a reference picture (which is also called a locally decoded picture) obtained by decoding another picture that is already encoded.

The CUs 102 are individually processed in a prediction unit (PU) 103 or a transform unit (TU) 104. The PU 103 is a unit generating a prediction block on which a prediction is performed in accordance with the encoding mode. For example, in the intra prediction encoding method, the PU 103 is a unit to which a prediction mode that specifies pixels referenced when the prediction block is generated and that specifies a generation method of the prediction block, is applied. In the inter prediction encoding method, the PU 103 is a unit for performing motion compensation. The size of the PU 103 can be selected, for example, among 2N×2N, N×N, 2N×N, N×2N, 2N×nU, 2N×nD, nR×2N, nL×2N (where N is CU size/2) when the inter prediction encoding method is applied. Additionally, the TU 104 is a unit for an orthogonal transformation and the orthogonal transformation is applied to each TU. The size of the TU 104 is selected from 4×4 to 32×32 pixels. The TU 104 is partitioned using the quadtree structure and is processed in the z-scan order.

The CTU is one example of the block obtained by partitioning a picture. The CU is another example of the block. Furthermore, the CU is one example of a sub-block obtained by partitioning the block.

In HEVC, the CTU is partitioned so that the CU is a square. However, when the horizontal size or the vertical size of a picture is not an integral multiple of the horizontal size or the vertical size of the CTU, the CTU located at a right side or a bottom side includes an edge of the picture. In this case, in order to encode the CTU without including information outside of the picture, it is preferable to partition the CTU so that a boundary between the CUs matches the edge of the picture, that is, so that the edge of the picture is not included in any CU. However, in order to partition the CTU so that the edge of the picture is not included in any CU, it may be required that the size of the CU is decreased and the number of the CUs included in the CTU is increased. In such a case, syntax information included in encoded data of the CTU may be increased and encoding efficiency may be reduced.

With respect to the description above, in order to improve the encoding efficiency, it is proposed that after partitioning the CTU into multiple sub-blocks using the quadtree structure, each CU is determined by further partitioning each of the sub-blocks using a binary tree structure (for example, see Non Patent Document 2). In this case, the CU may be a rectangle.

However, even when the binary tree structure is applied as described above, sub-blocks already partitioned in a square shape are not combined. Thus, with respect to the CTU including the edge of the picture, the CTU may not be able to be partitioned so that the size of the CU is large.

Additionally, a technology determining an edge block that is smaller than the size of a macroblock is proposed. This technology detects the size for a higher encoding efficiency from among the size of a non-square area determined to be the edge block and the size of multiple non-square areas obtained by partitioning the edge block either in a horizontal direction or a vertical direction (for example, see Patent Document 1).

RELATED-ART DOCUMENT

Patent Document

[Patent Document 1] Japanese Laid-Open Patent Publication No. 2011-223303

Non Patent Document

[Non Patent Document 1] Recommendation ITU-T H.265 (ISO/IEC 23008-2), "High Efficiency Video Coding", April 2013
[Non Patent Document 2] J. An et al, "Block partitioning structure for next generation video coding", ITU-T SG16 Doc. COM 16-C966, September 2015

SUMMARY

According to an embodiment, a moving image encoding device for encoding a picture to be encoded included in moving image data, includes a memory, and a processor coupled to the memory and configured to partition a picture edge block into a plurality of sub-blocks so that none of the plurality of sub-blocks include an edge of the picture to be encoded by partitioning the picture edge block into four in accordance with a quadtree structure or partitioning the picture edge block into two in a direction orthogonal to the edge included in the picture edge block, the picture edge block being a block including either a horizontal edge of the picture to be encoded or a vertical edge of the picture to be encoded among a plurality of blocks obtained by partitioning the picture to be encoded, generate a prediction block by referring to another encoded picture or an encoded area of the picture to be encoded for each of the plurality of sub-blocks, calculate a prediction error between a pixel of a given sub-block and a corresponding pixel of the prediction block corresponding to the given sub-block for each of the plurality of sub-blocks, and encode the prediction error, and add partitioning information indicating whether the picture edge block has been partitioned into four or two, to encoded moving image data.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Even when the edge block is encoded as a non-square area, a moving image encoding device includes syntax indicating a partitioning pattern of the edge block in encoded moving image data. Thus, when types of a partitioning pattern of the edge block that is a non-square area are increased, an encoding amount is increased, and this reduces the encoding efficiency.

According to at least one embodiment, a moving image encoding device disclosed in the present specification can improve an encoding efficiency even when an edge of a picture is included in a block that is a unit for an encoding process.

In the following, a moving image encoding device will be described with reference to the drawings. First, partitioning of a CTU including an edge of a picture will be described.

Figure 1:
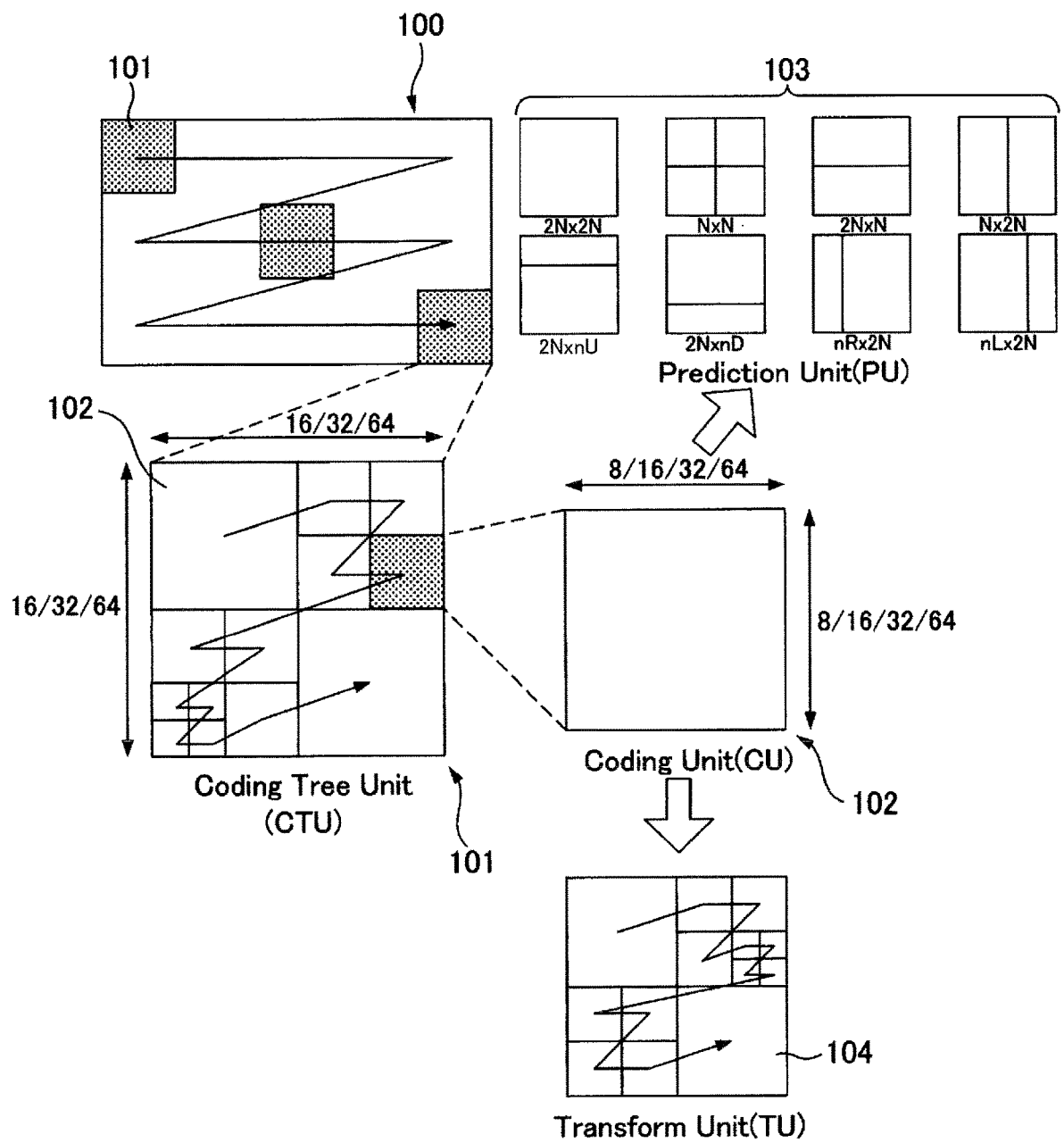
FIG. 1 is a drawing illustrating an example of partitioning a picture in HEVC.
Figure 2:
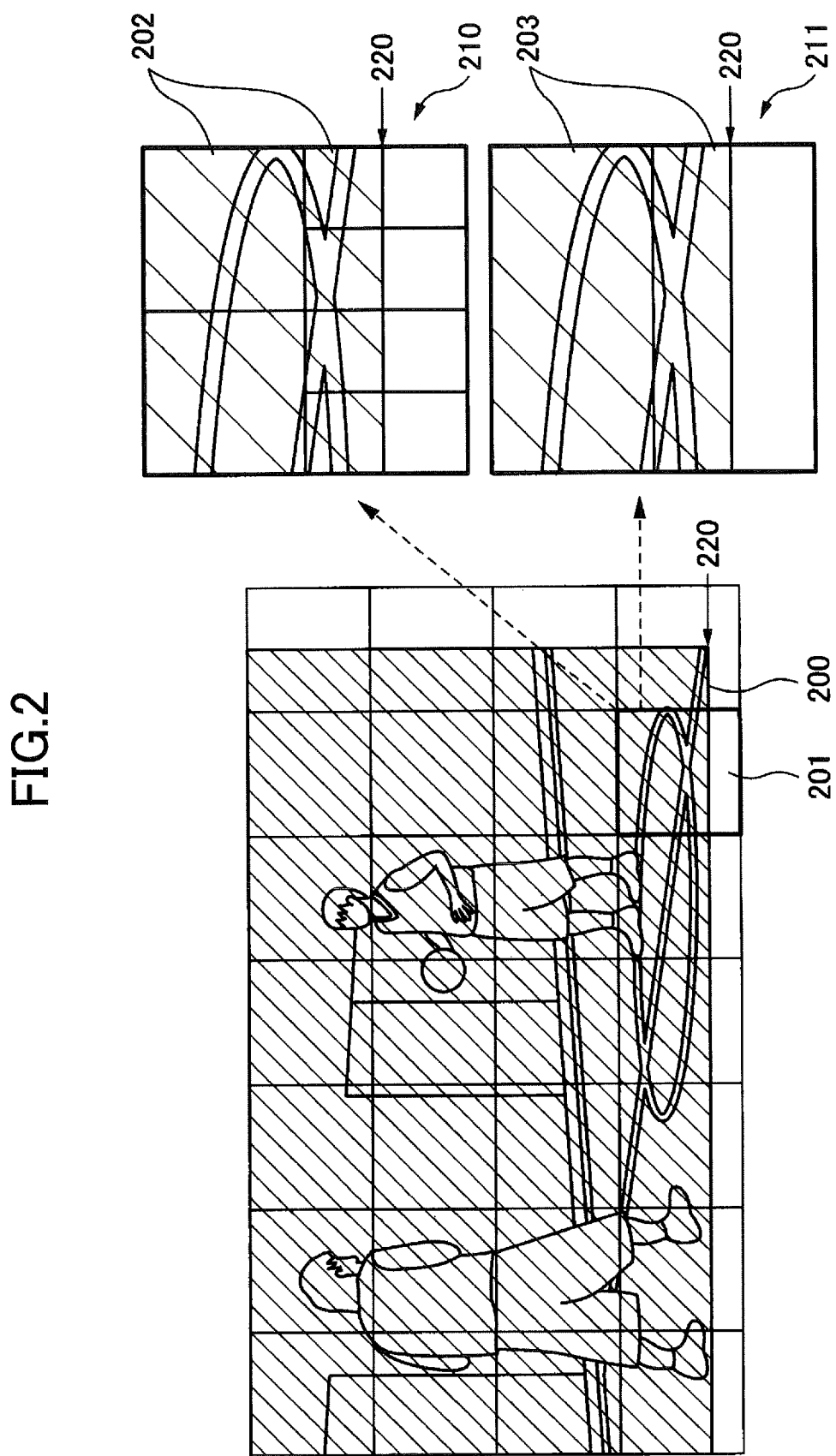
FIG. 2 is a drawing illustrating an example of partitioning a CTU including an edge of a picture.

FIG. 2 is a drawing illustrating an example of partitioning the CTU including an edge of a picture. In this example, since neither the horizontal size nor the vertical size of a picture 200 is an integral multiple of the CTU size, each of the right edge and the bottom edge of the picture 200 is included in CTUs at the right side or CTUs at the bottom side. With respect to a CTU 201 including the bottom edge of the picture 200 among these CTUs, as illustrated in a partitioning pattern 210, the CTU 201 is partitioned so that a picture edge 220 is not included in any of CUs 202. In such a case, a CU 202 that is one-fourth of the size of the CTU 201 is used to partition the CTU 201 using the quadtree structure so that the picture edge 220 and a boundary between the CUs 202 are matched. As a result, in this example, the CTU 201 is partitioned into six CUs 202. Even if each CU 202 is further partitioned using the binary tree structure after the CTU 201 is partitioned using the quadtree structure, the CTU 201 will be partitioned using more CUs.

With respect to this, when the CTU 201 including the picture edge is divided applying the binary tree structure from the beginning, the CTU 201 can be divided using non-square CUs 203 as illustrated in a partitioning pattern 211. However, by the related art in which the quadtree structure is applied to divide the CTU into multiple sub-blocks and then the binary tree structure is applied to each sub-block, the CTU 201 is first divided into square sub-blocks. Thus, the CTU 201 is not allowed to be partitioned as in the partitioning pattern 211.

In an embodiment, the moving image encoding device divides a block including either the right edge or the bottom edge of the picture using sub-blocks that have the lower encoding cost among sub-blocks of the quadtree structure (i.e., squares) and sub-blocks of the binary tree structure (i.e., rectangles). The moving image encoding device then adds the syntax indicating whether the quadtree structure or the binary tree structure has been applied to the block including the picture edge, to encoded moving image data.

As illustrated in FIG. 2, when the binary tree structure is applied to the block including the bottom edge of the picture to divide the block into multiple sub-blocks, it is preferable to partition the block along a direction orthogonal to the picture edge in order to reduce the number of sub-blocks. That is, the block including the bottom edge of the picture is preferably partitioned so that a boundary line between the sub-blocks is parallel to the picture edge. Thus, it is preferred that the block including the bottom edge of the picture is partitioned along the vertical direction so that the boundary line between the sub-blocks is horizontal. Similarly, when the binary tree structure is applied to a block including the right edge of the picture, the block is preferably partitioned along the horizontal direction so that the boundary line between the sub-blocks is vertical. Thus, the moving image encoding device is not required to include a partitioning direction in the encoded moving image data for the block to which the binary tree structure is applied. Additionally, the moving image encoding device applies the quadrant structure to a block including both the bottom edge and the right edge of the picture to divide the block.

The picture may be either a frame or a field. The frame is a still image in the moving image data, while the field is a still image obtained by retrieving only odd rows or even rows from the frame.

In the embodiment, the moving image encoding device divides the picture by a CTU and encodes the picture by a CTU, as in HEVC. However, the moving image encoding apparatus may encode the moving image data in accordance with other encoding standards which divide the picture into multiple blocks and encode each block.

Figure 3:
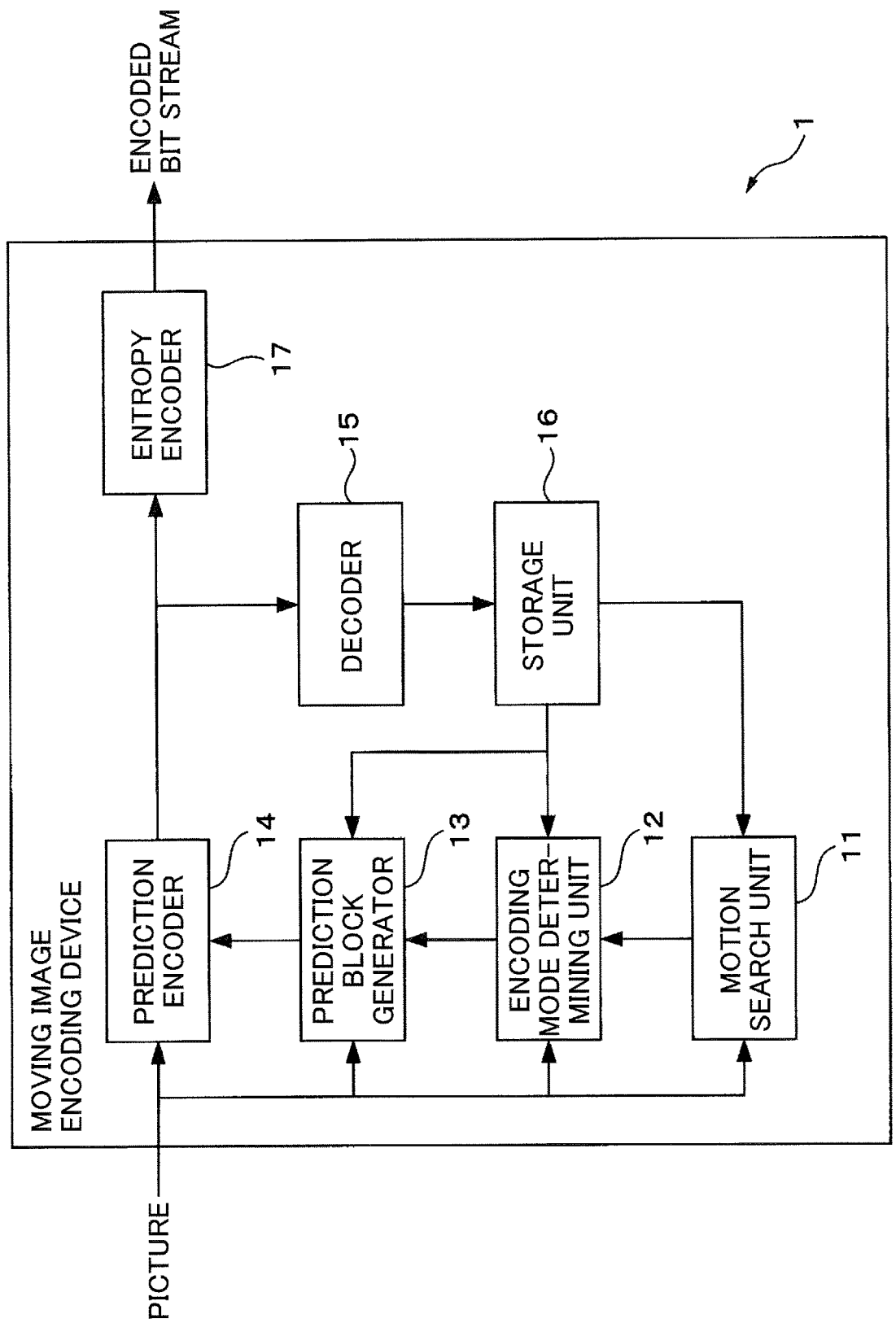
FIG. 3 is a schematic view of a configuration of a moving image encoding device according to an embodiment.

FIG. 3 is a schematic view of a configuration of the moving image encoding device according to the embodiment. The moving image encoding device 1 includes a motion search unit 11, an encoding mode determining unit 12, a prediction block generator 13, a prediction encoder 14, a decoder 15, a storage unit 16, and an entropy encoder 17.

The moving image encoding device 1 encodes each CTU of a picture to be encoded, in the order of raster scanning. In the following, each part of the moving image encoding device 1 will be described as an example of processing one CTU.

When the picture to be encoded that includes a CTU to be encoded is a P picture or a B picture to which the inter prediction encoding method is applicable, the motion search unit 11 calculates a motion vector for each applicable PU of the CTU to be encoded. Here, a brightness component is an example of a first component. A type of the picture to be encoded is determined based on, for example, a structure of a group of pictures (GOP) which a controller (which is not illustrated) applies to the moving image data to be encoded, and a position in the GOP of the picture to be encoded.

The motion search unit 11 performs a block matching operation to compare a PU of interest of the CTU to be encoded with reference area of at least one locally decoded picture and determines a reference block that matches the PU of interest best. The motion search unit 11 calculates a vector indicating the amount of movement between the PU of interest and the reference block as a motion vector. The motion search unit 11 calculates motion vectors for both an L0 prediction and an L1 prediction when the picture to be encoded is the B picture to which the bi-directional prediction encoding mode is applicable. The motion search unit 11 stores the motion vector of each PU and information indicating the locally decoded picture referenced by the motion vector in the storage unit 16 and notifies the encoding mode determining unit 12.

The encoding mode determining unit 12 is an example of a partitioning pattern determining unit and determines a partitioning pattern of the CU, the PU, and the TU in which the CTU to be encoded is partitioned, and the encoding mode applied to each CU. The encoding mode determining unit 12, for example, determines the encoding mode applicable to the CTU based on information indicating the type of the picture to be encoded including the CTU to be encoded that is obtained from the controller (which is not illustrated). The encoding mode determining unit 12 selects the encoding mode to be actually applied from among applicable encoding modes. When the type of the picture to be encoded is an I picture to which only the intra prediction encoding method is applicable, the encoding mode determining unit 12 selects the intra prediction encoding method as the encoding mode to be applied. When the type of the picture to be encoded is a P picture or a B picture, the encoding mode determining unit 12, for example, selects either the inter prediction encoding method or the intra prediction encoding method as the encoding mode to be applied.

The encoding mode determining unit 12 calculates the encoding cost, which is an evaluation value of the amount of encoded data of the CTU to be encoded with respect to the applicable encoding mode, for each CU. For example, in the inter prediction encoding method, the encoding mode determining unit 12 calculates the encoding cost for each combination of a CU partitioning pattern that partitions the CTU, a PU partitioning pattern, and a vector mode that defines a method for generating a prediction vector of the motion vector. The encoding mode determining unit 12 can use, for example, either an advanced motion vector prediction (AMVP) mode or a merge mode as the vector mode.

In the intra prediction encoding method, the encoding mode determining unit 12 calculates the encoding cost for each combination of the CU partitioning pattern that partitions the CTU, the PU partitioning pattern, and the prediction mode that defines a reference direction in the picture.

In order to calculate the encoding cost, for example, for the PU of interest, the encoding mode determining unit 12 calculates a prediction error, that is, the sum of absolute differences SAD, in accordance with the following equation:

$$SAD = \Sigma |OrgPixel - PredPixel|$$

Here, OrgPixel is a value of a pixel included in the PU of interest, and PredPixel is a value of a pixel included in the prediction block corresponding to the block of interest, generated in accordance with the encoding mode being a calculation object of the encoding cost.

The encoding mode determining unit 12 calculates the encoding cost of the CU of interest according to the following equation for example.

$$Cost = \Sigma SAD + \lambda * B$$

Here, $\Sigma SAD$ is the sum of SAD calculated for respective PUs included in the CU of interest. B is an estimated value of code amount of elements other than the prediction error, such as the motion vector and a flag indicating the prediction mode. $\lambda$ is the Lagrange multiplier.

The encoding mode determining unit 12 may calculate the sum of absolute transformed differences SATD of Hadamard coefficients of each pixel that is obtained after the Hadamard transform is applied to a differential image between the PU of interest and the prediction block, instead of the SAD.

The encoding mode determining unit 12 sets the CU of interest, for example, in the order from a larger size of the possible CU sizes in the CTU to be encoded. The encoding mode determining unit 12 selects a prediction mode that minimizes the cost for each PU partitioning pattern for the CU of interest with respect to the intra prediction encoding method. Additionally, the encoding mode determining unit 12 selects a vector mode that minimizes the cost for each PU partitioning pattern for the CU of interest with respect to the inter prediction encoding method. Furthermore, the encoding mode determining unit 12 selects an encoding mode having a lower encoding cost from among the intra prediction encoding method and the inter prediction encoding method for each CU of the same size, as the encoding mode to be applied to the CU.

When the picture edge is not included in the CU of interest, for each of the four CUs generated by partitioning the CU of interest in accordance with the quadtree structure, the encoding mode determining unit 12 performs a process similar to the process above as next CU of interest to calculate the minimum encoding cost. If the sum of the minimum encoding costs calculated for the respective partitioned CUs is less than the minimum encoding cost for the CU of interest, the encoding mode determining unit 12 partitions the CU of interest into four in accordance with the quadtree structure. The encoding mode determining unit 12 determines the CU partitioning pattern and the PU partitioning pattern that are applied to the CTU to be encoded by repeating the above-described process until each CU is no longer partitioned.

When the CTU of interest or CU of interest (which will be hereinafter referred to as the block of interest) includes both the right edge and the bottom edge of the picture, the encoding mode determining unit 12 partitions the block of interest into four in accordance with the quadtree structure. This is because when the block of interest includes both the right edge and the bottom edge of the picture, it is necessary to partition the block of interest for both horizontal and vertical directions so that both the right edge and the bottom edge of the picture are not included in any CU.

When the block of interest includes the right edge of the picture and does not include the bottom edge of the picture, the encoding mode determining unit 12 partitions the block of interest into four sub-blocks in accordance with the quadtree structure. Furthermore, the encoding mode determining unit 12 partitions the block of interest into two sub-blocks in the horizontal direction in accordance with the binary tree structure. Similarly, when the block of interest includes the bottom edge of the picture and does not include the right edge of the picture, the encoding mode determining unit 12 partitions the block of interest into four sub-blocks in accordance with the quadtree structure and partitions the block of interest into two sub-blocks in the vertical direction.

When any sub-block obtained by partitioning the block of interest includes the picture edge, the encoding mode determining unit 12 further partitions the sub-block including the picture edge into four or two as described above. The encoding mode determining unit 12 repeats the above-described process until the picture edge is not included in any sub-block.

However, with respect to a block that is once partitioned along the horizontal direction in accordance with the binary tree structure, the encoding mode determining unit 12 partitions a sub-block including the picture edge among sub-blocks obtained by partitioning the block, also along the horizontal direction in accordance with the binary tree structure. Similarly, with respect to a block that is once partitioned along the vertical direction in accordance with the binary tree structure, the encoding mode determining unit 12 partitions a sub-block including the picture edge among sub-blocks obtained by partitioning the block, also along the vertical direction in accordance with the binary tree structure.

The encoding mode determining unit 12 performs a process similar to the process described above for each combination of the obtained sub-blocks to calculate the encoding cost. The encoding mode determining unit 12 may select a combination of sub-blocks having the minimum encoding cost and may use sub-blocks included in the selected combination as one CU.

Figure 4:
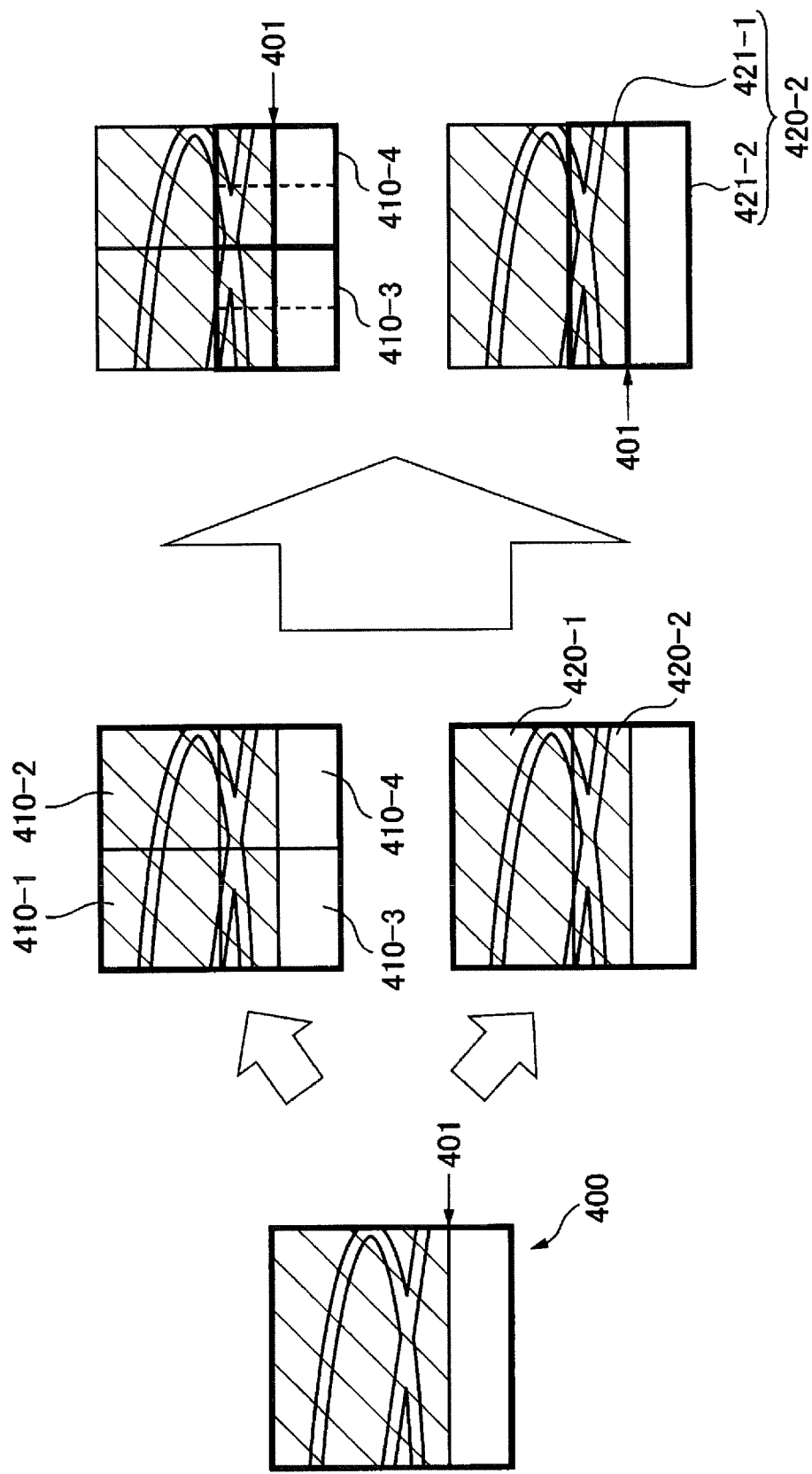
FIG. 4 is a drawing illustrating an example of partitioning the CTU including a bottom edge of a picture.

FIG. 4 is a drawing illustrating an example of partitioning the CTU including the bottom edge of the picture. In the example illustrated in FIG. 4, a CTU 400 includes a bottom picture edge 401. Thus, the encoding mode determining unit 12 applies the quadtree structure to the CTU 400 to partition the CTU 400 into four square CUs 410-1 to 410-4, or applies the binary tree structure to partition the CTU 400 into two CUs 420-1 and 420-2 in the vertical direction. The encoding mode determining unit 12 may further partition the CU 410-1 and the CU 410-2 into four in accordance with the quadtree structure because the CU 410-1 and the CU 410-2 do not include the bottom picture edge 401. The encoding mode determining unit 12 may determine whether to partition the CU 410-1 and the CU 410-2 into four based on the encoding cost. Since the CU 410-3 and the CU 410-4 include the bottom picture edge 401, the encoding mode determining unit 12 partitions the CU 410-3 and the CU 410-4 into four in accordance with the quadtree structure or into two in accordance with the binary tree structure in the vertical direction.

The encoding mode determining unit 12 may further partition the CU 420-1, which does not include the bottom picture edge 401, into two in accordance with the binary tree structure in the vertical direction. The encoding mode determining unit 12 may determine whether to partition the CU 420-1 into two based on the encoding cost. The encoding mode determining unit 12 further partitions the CU 420-2, which includes the bottom picture edge 401, into two CUs, which are the CU 421-1 and the CU 421-2, in accordance with the binary tree structure in the vertical direction.

Finally, the sum of the encoding costs of respective CUs is calculated for each combination of CUs obtained when all CUs do not include the bottom picture edge 401, and the CTU 400 is partitioned according to the combination of CUs that has the minimum sum. For example, when the sum of the encoding costs for the combination of the CU 420-1 and the CU 421-1 is minimum, the CTU 400 is partitioned into the CU 420-1 and the CU 421-1. The encoding mode determining unit 12 generates the syntax indicating whether the quadtree structure or the binary tree structure has been applied to the CTU or the CU at each time of partitioning the CTU or the CU, and notifies the entropy encoder 17 of the syntax. The syntax, which indicates whether the quadtree structure or the binary tree structure has been applied, is an example of partitioning information. Here, with respect to CUs obtained applying the binary tree structure, the syntax indicating whether the quadtree structure or the binary tree structure has been applied is not necessary to be generated because the quadtree structure is not applied to the CUs even if the CUs are further partitioned.

Figure 5:
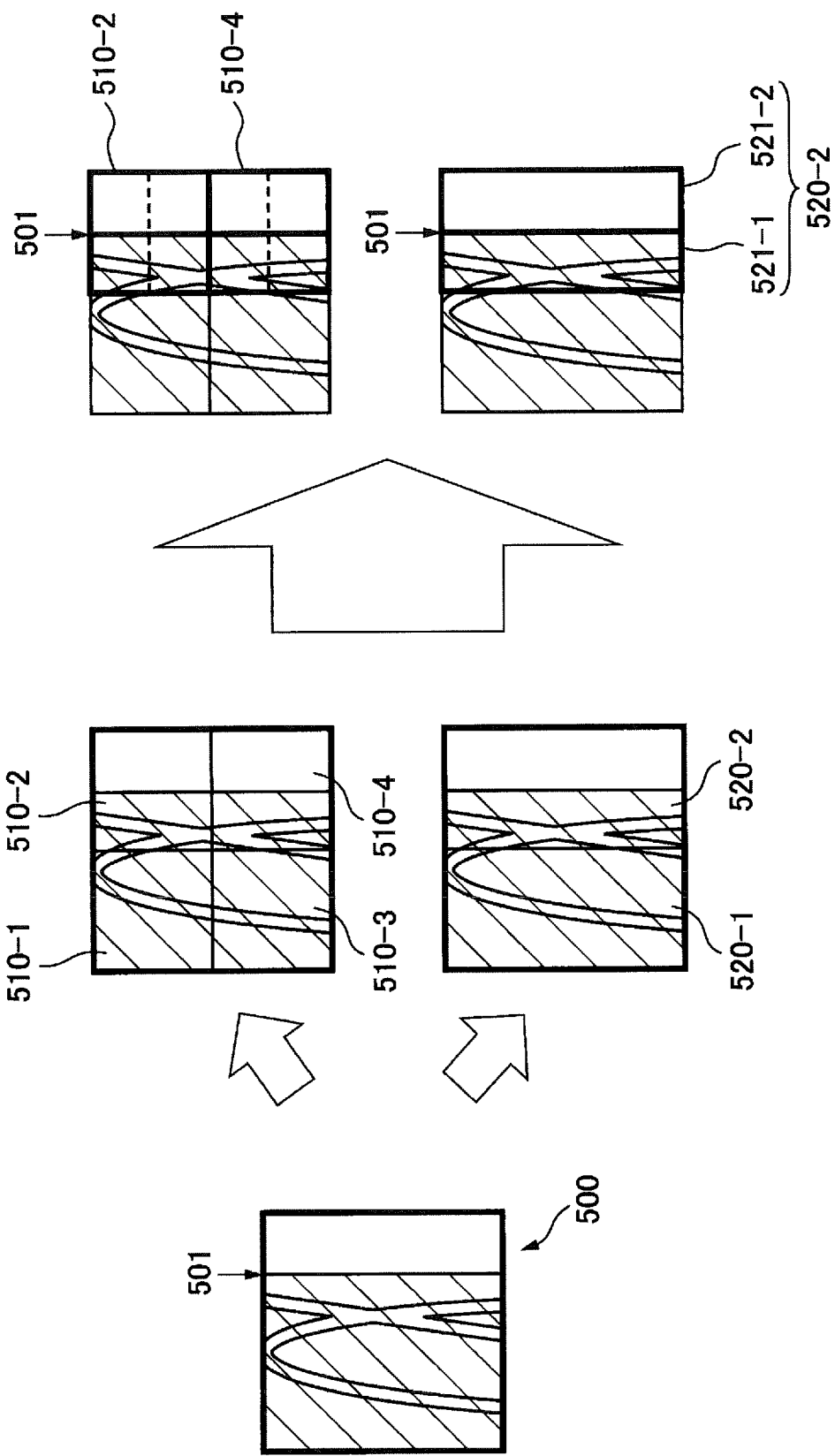
FIG. 5 is a drawing illustrating an example of partitioning the CTU including a right edge of a picture.

FIG. 5 is a drawing illustrating an example of partitioning the CTU including the right edge of the picture. In the example illustrated in FIG. 5, a CTU 500 includes a right picture edge 501. Thus, the encoding mode determining unit 12 applies the quadtree structure to the CTU 500 to partition the CTU 500 into four square CUs 510-1 to 510-4, or applies the binary tree structure to partition the CTU 500 into two CUs 520-1 and 520-2 in the horizontal direction. The encoding mode determining unit 12 may further partition the CU 510-1 and the CU 510-3 into four in accordance with the quadtree structure because the CU 510-1 and the CU 510-3 do not include the right picture edge 501. The encoding mode determining unit 12 may determine whether to partition the CU 510-1 and the CU 510-3 into four based on the encoding cost. Since the CU 510-2 and the CU 510-4 include the right picture edge 501, the encoding mode determining unit 12 partitions the CU 510-2 and the CU 510-4 into four in accordance with the quadtree structure or into two in accordance with the binary tree structure in the horizontal direction. Additionally, the encoding mode determining unit 12 partitions the CU 520-2 including the right picture edge 501 into two CUs, which are CUs 521-1 and 521-2, in the horizontal direction in accordance with the binary tree structure.

Finally, the sum of the encoding costs of respective CUs is calculated for each combination of CUs obtained when all CUs do not include the right picture edge 501, and the CTU 500 is partitioned according to the combination of CUs that has the minimum sum.

Figure 6:
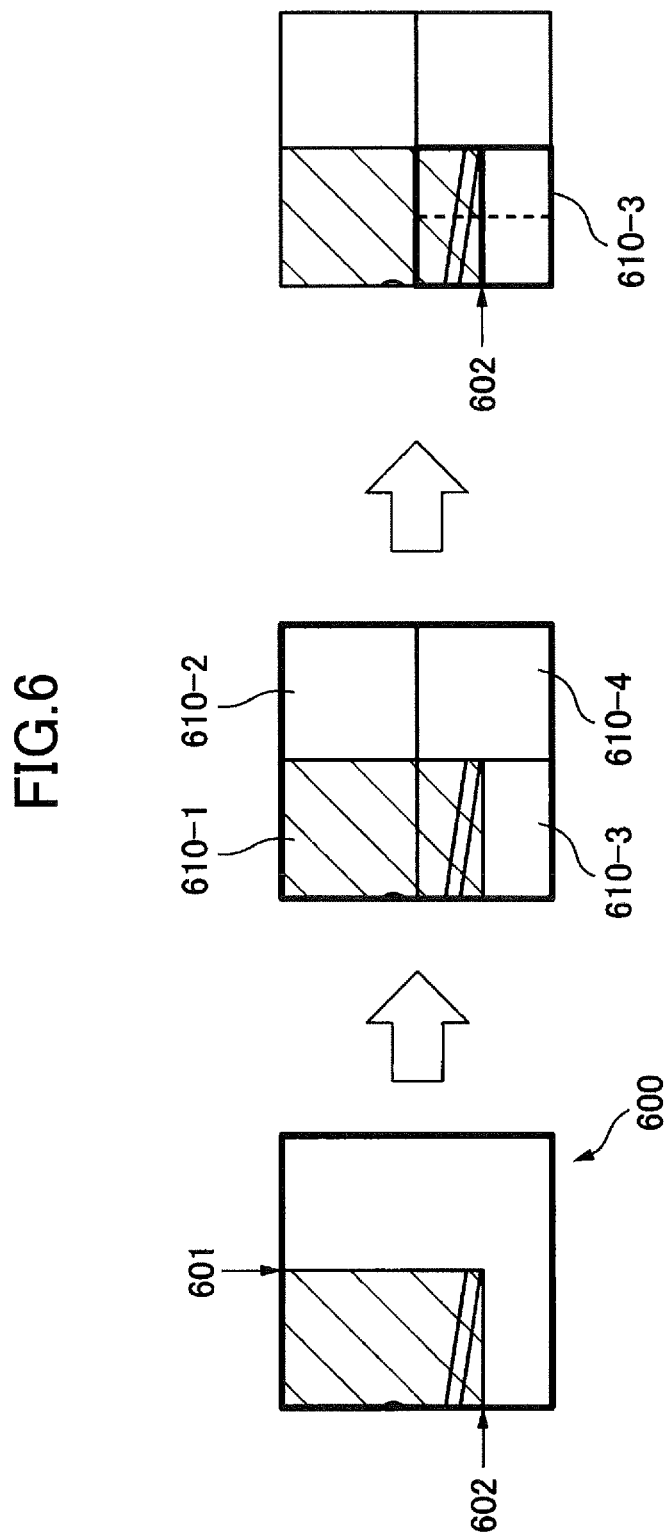
FIG. 6 is a drawing illustrating an example of partitioning the CTU including both a bottom edge and a right edge of a picture.

FIG. 6 is a drawing illustrating an example of partitioning the CTU including both the bottom edge and the right edge of the picture. In the example illustrated in FIG. 6, a CTU 600 includes a right picture edge 601 and a bottom picture edge 602. Thus, the encoding mode determining unit 12 applies the quadtree structure to the CTU 600 and partitions the CTU 600 into four squares CUs 610-1 to 610-4. The encoding mode determining unit 12 may further partition the CU 610-1 into four in accordance with the quadtree structure because the CU 610-1 does not include both the right picture edge 601 and the bottom picture edge 602. The encoding mode determining unit 12 may determine whether to partition the CU 610-1 into four based on the encoding cost. Additionally, since the CU 610-3 includes the bottom picture edge 602, the encoding mode determining unit 12 may repeat partitioning in accordance with the quadtree structure or the binary tree structure until the bottom picture edge 602 is not included in the CU in a manner similar to the CTU 400 illustrated in FIG. 4. Here, since the CU 610-2 and CU 610-4 do not include the picture, the CU 610-2 and the CU 610-4 are ignored.

The encoding mode determining unit 12 determines the TU partitioning pattern for each CU partitioned in accordance with the CU partitioning pattern determined as described above. At this time, the encoding mode determining unit 12 calculates a RD cost according to the following equation for each applicable TU partitioning pattern.

$$\text{Cost} = \Sigma_i (org(i) - ldec(i))^2 + 2 \cdot \text{bit}$$

Here, org(i) is a value of a pixel included in the CU of interest, and ldec(i) indicates a value of a decoded pixel obtained by encoding the CU using the TU division pattern of interest and further decoding the CU. Additionally, bit indicates the code amount when the CU is encoded using the TU partitioning pattern of interest. The first term on the right hand side of Equation (1) indicates encoding distortion, and the second term on the right hand side indicates the coding amount. Thus, in the TU division pattern having lowest RD cost, the encoding distortion is optimally balanced with the code amount.

The encoding mode determining unit 12 selects the TU division pattern that minimizes the RD cost.

The encoding mode determining unit 12 notifies the prediction block generator 13 of the combination of the CU and PU partitioning pattern and the encoding mode that are selected for the CTU to be encoded, and notifies the prediction encoder 14 of the TU partitioning pattern. The encoding mode determining unit 12 stores the combination of the CU, PU, and TU partitioning patterns and the encoding mode that are selected for the CTU to be encoded, in the storage unit 16. Here, the information indicating the partitioning pattern that partitions the CTU into CUs includes, for example, information indicating whether each of the sub-blocks obtained by recursively partitioning the CTU has been partitioned. Furthermore, the encoding mode determining unit 12 generates the syntax indicating whether the quadtree structure or the binary tree structure has been applied to the CTU including the picture edge and the sub-block including the picture edge among the sub-blocks obtained by recursively partitioning the CTU. The encoding mode determining unit 12 passes the syntax to the entropy encoder 17.

Figure 7:
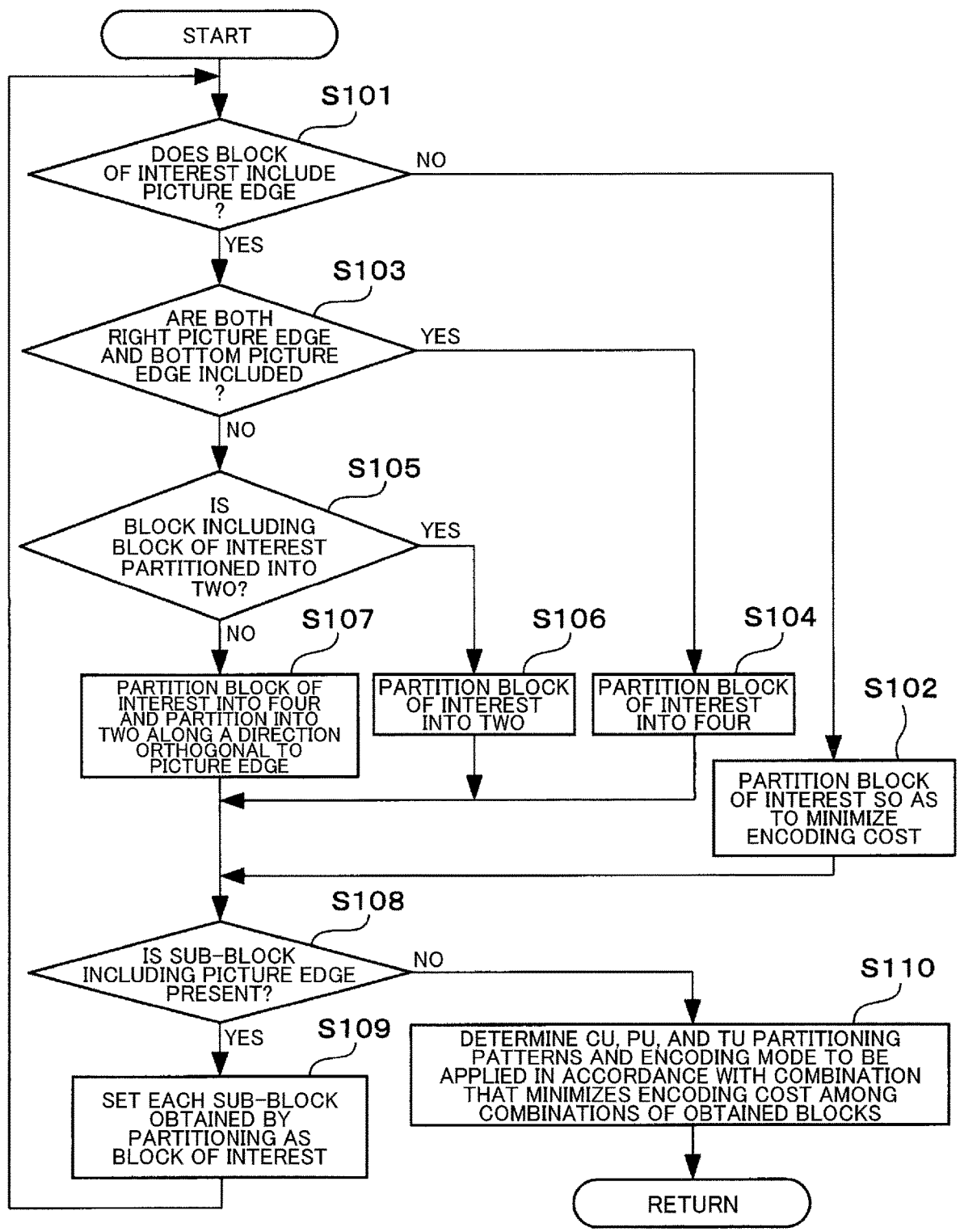
FIG. 7 is an operation flowchart of a process of determining a partitioning pattern and an encoding mode by an encoding mode determining unit.

FIG. 7 is an operation flowchart of a process of determining the partitioning pattern and the encoding mode by the encoding mode determining unit 12.

In step S101, the encoding mode determining unit 12 determines whether the block of interest includes the picture edge. The first block of interest is the CTU to be encoded.

In step S102, when the block of interest does not include the picture edge (NO in step S101), the encoding mode determining unit 12 partitions the block of interest so as to minimize the encoding cost. Here, when the coding cost is smaller if the block of interest is not partitioned, the block of interest may not be further partitioned. When the block of interest includes the picture edge (YES in step S101), in step S103, the encoding mode determining unit 12 determines whether the block of interest includes both the right picture edge and the bottom picture edge.

When the block of interest includes both the right picture edge and the bottom picture edge (YES in step S103), in step S104, the encoding mode determining unit 12 partitions the block of interest into four in accordance with the quadtree structure. When the block of interest includes either the right picture edge or the bottom picture edge (NO in step S103), in step S105, the encoding mode determining unit 12 determines whether a block including the block of interest has been partitioned into two.

When the block including the block of interest has been partitioned into two (YES in step S105), in step S106, the encoding mode determining unit 12 also partitions the block of interest into two sub-blocks. At this time, the encoding mode determining unit 12 may partition the block of interest along the same direction as the partitioning direction of the block including the block of interest.

When the block including the block of interest has not been partitioned into two (NO in step S105), the encoding mode determining unit 12 partitions the block of interest into four sub-blocks to generate four square sub-blocks. In step S107, the encoding mode determining unit 12 further partitions the block of interest into two sub-blocks along the direction orthogonal to the picture edge to generate two rectangular sub-blocks.

In step 3108, the encoding mode determining unit 12 determines whether a sub-block including the picture edge is present after step S102, step S104, step S106, or step S107. When the picture edge is included in any sub-block (YES in step S108), in step S109, the encoding mode determining unit 12 sets each sub-block as the block of interest. The encoding mode determining unit 12 performs the process as of step S101 for the block of interest.

When the picture edge is not included in any of the sub-blocks (NO in step S108), the encoding mode determining unit 12 selects a combination that minimizes the encoding cost from the obtained combinations of blocks. In step S110, the encoding mode determining unit 12 determines the CU, PU, and TU partitioning patterns and the encoding mode to be applied according to the selected combination. The encoding mode determining unit 12 ends the process of determining the partitioning pattern and the encoding mode.

The prediction block generator 13 generates a prediction block for each PU according to the combination of the CU and PU partitioning patterns and the encoding mode that are selected for the CTU to be encoded.

For example, when the PU of interest is encoded by the intra prediction encoding method, the prediction block generator 13 generates the prediction block based on values of pixels in the locally decoded block around the PU, which is referenced in accordance with the prediction mode selected for the PU. When the PU of interest is encoded by the inter prediction encoding method, the prediction block generator 13 generates the prediction block by performing the motion compensation on the locally decoded picture that is read from the storage unit 16 and that is referenced by the PU based on the motion vector calculated for the PU.

The prediction block generator 13 passes the generated prediction block to the prediction encoder 14 and the decoder 15.

The prediction encoder 14 performs the prediction encoding of the CTU to be encoded.

The prediction encoder 14 performs a differential calculation between each pixel in the CTU to be encoded and a corresponding pixel in the prediction block. The prediction encoder 14 uses a difference value corresponding to each pixel in a TU obtained by the differential calculation for each TU in the CTU to be encoded as the prediction error signal of each pixel of the TU.

The prediction encoder 14 generates a list of possible prediction vectors of each PU to be encoded by the inter prediction encoding method according to the vector mode determined to be applied by the encoding mode determining unit 12. The prediction encoder 14 calculates the prediction error signal between the motion vector of the PU and each of the possible prediction vectors. The prediction encoder 14 determines the prediction vector from among the possible prediction vectors for each PU to be encoded by the inter prediction encoding method, based on the prediction error signal calculated for each of the possible prediction vectors. The prediction encoder 14 passes, for example, information determining the prediction vector in the list of the possible prediction vectors for the motion vector of each PU and the prediction error signal between the motion vector and the prediction vector, to the entropy encoder 17.

The prediction encoder 14 obtains orthogonal transformation coefficients indicating a horizontal frequency component and a vertical frequency component of the prediction error signal by the orthogonal transformation of the prediction error signal of each TU in the CTU to be encoded. For example, the prediction encoder 14 performs a discrete cosine transform (DCT) as an orthogonal transformation process on the prediction error signal to obtain a set of DCT coefficients as the orthogonal transformation coefficients.

The prediction encoder 14 calculates quantized orthogonal transformation coefficients by quantizing the orthogonal transformation coefficients of each TU in the CTU to be encoded in accordance with a quantization parameter that includes a qp value specifying the quantization width and the like. In the following, the quantized orthogonal transformation coefficients may be simply called the quantization coefficients.

The prediction encoder 14 outputs the quantized orthogonal transformation coefficients to the decoder 15 and the entropy encoder 17.

The decoder 15 generates the locally decoded block referenced to encode, for example, the CU after the TU, from the quantization coefficients of each TU in the CTU to be encoded, and stores the locally decoded block in the storage unit 16.

The decoder 15 restores the orthogonal transformation coefficients before quantization by performing the inverse quantization on the quantization coefficients of each TU. For example, the decoder 15 performs the inverse orthogonal transformation on the restored orthogonal transformation coefficients for each TU. For example, when the prediction encoder 14 uses DCT as the orthogonal transformation, the decoder 15 performs the inverse DCT process as the inverse orthogonal transformation. By this, for each TU, the decoder 15 restores the prediction error signal having information similar to the prediction error signal before encoding.

The decoder 15 generates the locally decoded block by adding the restored prediction error signal to a value of each pixel of the prediction block of each TU.

The decoder 15 stores the locally decoded block in the storage unit 16 every time the locally decoded block is generated.

The decoder 15 writes the locally decoded picture obtained by combining the locally decoded blocks of one picture in accordance with the encoding order of the CTUs, to the storage unit 16.

The storage unit 16 temporarily stores the locally decoded block received from the decoder 15. The storage unit 16 supplies the locally decoded picture or the locally decoded block to the motion search unit 11, the encoding mode determining unit 12, and the prediction block generator 13. The storage unit 16 stores a predetermined number of the locally decoded pictures that may be referenced by the picture to be encoded. When the number of the locally decoded pictures exceeds the predetermined number, the storage unit 16 discards the locally decoded picture in the order from the older encoding time.

The storage unit 16 further stores the motion vector for each of the locally decoded blocks encoded by the inter prediction encoding method. Additionally, the storage unit 16 stores the combination of the CU, PU, and TU partitioning patterns and the encoding mode selected for each CTU.

The entropy encoder 17 is an example of an adding unit. The entropy encoder 17 performs entropy encoding of, for example, the quantization coefficients and various syntax of each TU of the CTU to be encoded. The entropy encoder 17 also performs entropy encoding of, for example, information specifying the prediction vector in a list of the possible prediction vectors for each PU to be encoded by the inter prediction encoding method. The syntax includes syntax indicating an applied one of the quadtree structure and the binary tree structure for the CTU including the picture edge and each sub-block that is obtained by recursively partitioning the CTU and that includes the picture edge.

In the embodiment, the entropy encoder 17 uses an arithmetic encoding process such as context-based adaptive binary arithmetic coding (CABAC) as an entropy encoding method. The entropy encoder 17 outputs a bit stream obtained by entropy encoding.

An encoded bit stream including encoded moving image data is obtained by combining the bit streams of respective CTUs output from the entropy encoder 17 in a predetermined order and adding the header information defined by the HEVC. The moving image encoding device 1 stores the encoded bit stream in a storage device (which is not illustrated) including a magnetic recording medium, an optical recording medium, or a semiconductor memory, or outputs the encoded bit stream to another device.

Figure 8:
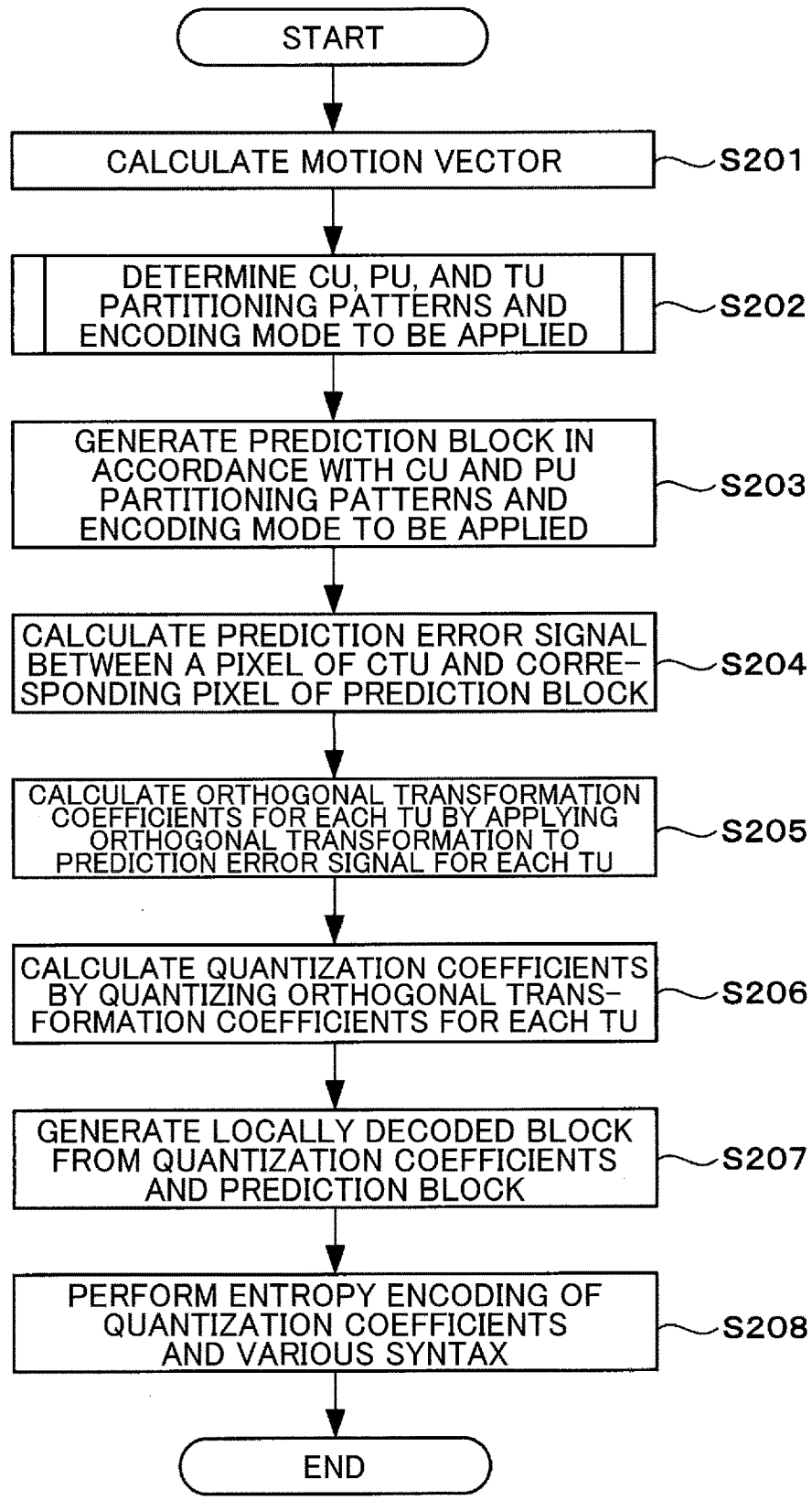
FIG. 8 is an operation flowchart of a moving image encoding process.

FIG. 8 is an operation flowchart of a moving image encoding process performed by the moving image encoding device 1. The moving image encoding device 1 performs the moving image encoding process in accordance with the following operation flowchart for each CTU.

In step S201, the motion search unit 11 calculates the motion vector for each PU in the CTU to be encoded, to which the inter prediction encoding method can be applied. The motion search unit 11 notifies the encoding mode determining unit 12 of the motion vector of each PU. When the picture to be encoded that includes the CTU to be encoded is the B picture, the motion vector is calculated for an L0 direction and an L1 direction. When the picture to be encoded is the I picture, the process of step S201 may be omitted.

In step S202, the encoding mode determining unit 12 determines the CU, PU, and TU partitioning patterns and the encoding mode to be applied so as to minimize the encoding cost of the CTU to be encoded. The encoding mode determining unit 12 notifies the prediction block generator 13 of the CU and PU partitioning patterns and the encoding mode to be applied, and notifies the prediction encoder 14 of the TU partitioning pattern. The encoding mode determining unit 12 stores the CU, PU, and TU partitioning patterns and the encoding mode to be applied in the storage unit 16.

In step S203, the prediction block generator 13 generates the prediction block in accordance with the determined CU and PU partitioning patterns and the encoding mode to be applied. The prediction block generator 13 passes the generated prediction block to the prediction encoder 14 and the decoder 15.

In step S204, the prediction encoder 14 calculates the prediction error signal between the pixel of the CTU to be encoded and the corresponding pixel of the prediction block. In step S205, the prediction encoder 14 calculates the orthogonal transformation coefficients for each TU by performing the orthogonal transformation on the prediction error signal of each pixel for the TU. In step S206, the prediction encoder 14 calculates the quantization coefficients by quantizing the orthogonal transformation coefficients of each TU of the CTU to be encoded. The prediction encoder 14 outputs the quantization coefficients of each TU to the decoder 15 and the entropy encoder 17.

In step S207, the decoder 15 restores the prediction error signal from the quantization coefficients of each TU of the CTU to be encoded and generates the locally decoded block corresponding to the CTU based on the restored prediction error signal and the corresponding prediction block. The decoder 15 stores the locally decoded block in the storage unit 16.

In step S208, the entropy encoder 17 performs entropy encoding of, for example, the quantization coefficients and various syntax. The various syntax includes syntax indicating whether the quadtree structure or the binary tree structure has been applied to the CTU or the CU including the picture edge. The entropy encoder 17 outputs the obtained encoded bit stream. The moving image encoding device 1 then ends the moving image encoding process for one CTU.

As described above, the moving image encoding device partitions the block including either the right picture edge or the bottom picture edge in accordance with a structure with the smaller encoding cost among the quadtree structure and the binary tree structure in the direction orthogonal to the picture edge. Thus, the moving image encoding device can apply the binary tree structure to the block including the picture edge from the beginning, and this can prevent the block including the picture edge from being excessively partitioned. The moving image encoding device adds the syntax indicating the structure that has been applied to the block including the picture edge among the quadtree structure and the binary tree structure, to the encoded moving image data. With respect to this, for the block to which the binary tree structure has been applied, the syntax indicating the partitioning direction may not be added to the encoded moving image data. Therefore, the moving image encoding device can reduce the code amount of the information indicating the partitioning pattern of the block including the picture edge that is included in the encoded moving image data. Accordingly, the moving image encoding device can improve the encoding efficiency even when the picture edge is included in the block.

Figure 9:
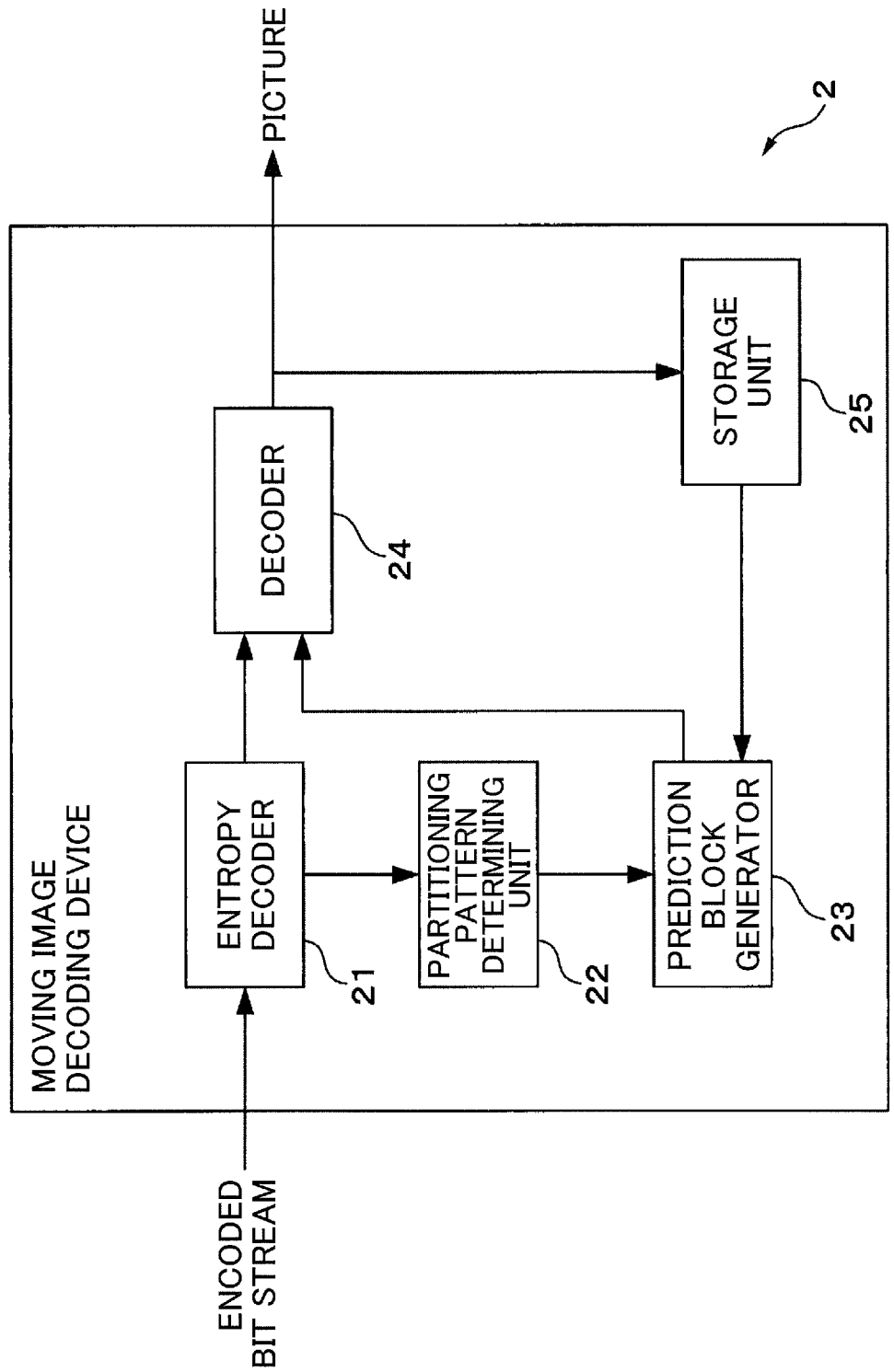
FIG. 9 is a schematic block diagram of a moving image decoding device.

FIG. 9 is a schematic block diagram of a moving image decoding device that decodes the moving image data encoded by the moving image encoding device according to the embodiment described above. A moving image decoding device 2 includes an entropy decoder 21, a partitioning pattern determining unit 22, a prediction block generator 23, a decoder 24, and a storage unit 25.

Each of these parts of the moving image decoding device 2 is formed as a separate circuit. Alternatively, each of these parts of the moving image decoding device 2 may be implemented in the moving image decoding device 2 as a single integrated circuit in which circuits corresponding to respective parts are integrated. Additionally, each of these parts of the moving image decoding device 2 may be a functional module implemented by a computer program executed by a processor of the moving image decoding device 2.

The moving image decoding device 2 obtains the encoded bit stream including the encoded moving image data, for example, through a communication network and an interface circuit for connecting the moving image decoding device 2 to the communication network. The moving image decoding device 2 stores the encoded bit stream in a buffer memory that is not illustrated. The moving image decoding device 2 reads the encoded data of each CTU from the buffer memory and inputs data of each CTU to the entropy decoder 21.

The entropy decoder 21 performs entropy decoding of the data encoded in each CTU. The entropy decoder 21 decodes the quantization coefficients of each TU in the CTU. The entropy decoder 21 performs entropy decoding of the information specifying the motion vector for each PU included in the CU encoded by the inter prediction encoding method (for example, the information indicating the vector mode to be applied and the prediction vector of the motion vector). Furthermore, the entropy decoder 21 performs entropy decoding of the prediction mode for each PU included in the CU encoded by the intra prediction encoding method. Further, the entropy decoder 21 performs entropy decoding of the various syntax including the partitioning pattern that has been applied and the encoding mode. The entropy decoder 21 passes the syntax indicating the CU, PU, and TU partitioning patterns to the partitioning pattern determining unit 22 and the prediction block generator 23. Further, the entropy decoder 21 passes the syntax indicating whether the quadtree structure or the binary tree structure has been applied to the CTU including the picture edge and each of the sub-blocks obtained by recursively partitioning the CTU and including the picture edge, to the partitioning pattern determining unit 22. The entropy decoder 21 passes other syntax and the like to the prediction block generator 23. Further, the entropy decoder 21 passes the quantization coefficients to the decoder 24.

The partitioning pattern determining unit 22 partitions the CTU to be decoded into the CUs. At this time, when the CTU to be decoded does not include the picture edge, the partitioning pattern determining unit 22 may partition the CTU to be decoded into the CUs by referring to the syntax indicating the partitioning pattern of the CTU to be decoded, which is decoded by the entropy decoder 21.

With respect to the above, when the CTU to be decoded includes either the right picture edge or the bottom picture edge, the partitioning pattern determining unit 22 partitions the CTU to be decoded into four or two by referring to the syntax indicating whether the quadtree structure or the binary tree structure has been applied. That is, when the quadtree structure has been applied to the CTU to be decoded, the partitioning pattern determining unit 22 partitions the CTU to be decoded into four. When the binary tree structure has been applied to the CTU to be decoded, the partitioning pattern determining unit 22 partitions the CTU to be decoded into two. At this time, the partitioning pattern determining unit 22 may partition the CTU to be decoded into two along the direction orthogonal to the picture edge included in the CTU to be decoded. That is, when the CTU to be decoded includes the right picture edge, the partitioning pattern determining unit 22 partitions the CTU to be decoded into two along the horizontal direction. When the CTU to be decoded includes the bottom picture edge, the partitioning pattern determining unit 22 partitions the CTU to be decoded in two along the vertical direction.

When the CTU to be decoded includes both the right picture edge and the bottom picture edge, the partitioning pattern determining unit 22 partitions the CTU to be decoded into four.

The partitioning pattern determining unit 22 may perform a process similar to the process performed on the CTU to be decoded, on each sub-block obtained by partitioning the CTU to be decoded. When a sub-block does not include the picture edge and the decoded syntax indicates the sub-block is not further partitioned, the sub-block is one CU.

Figure 10:
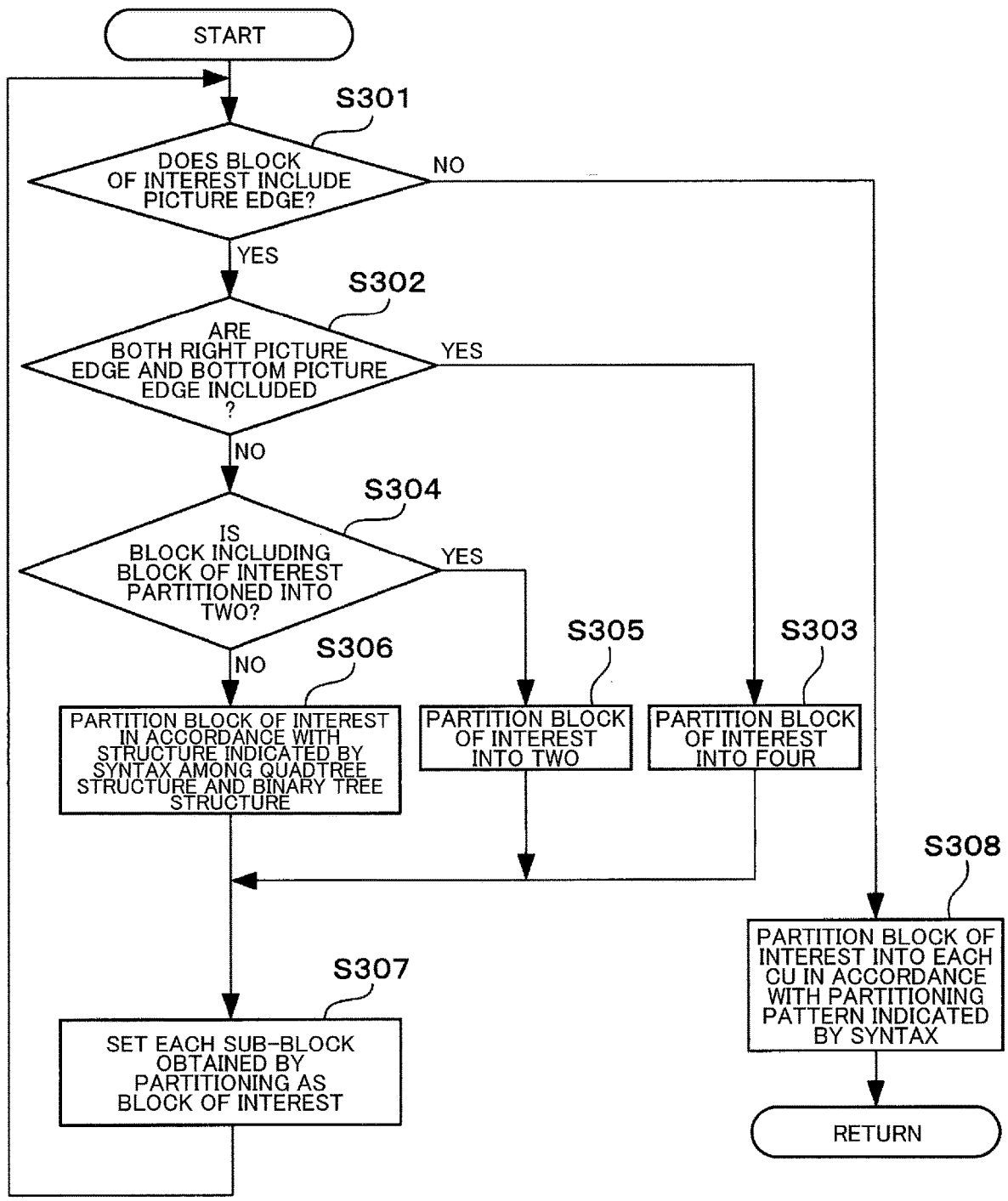
FIG. 10 is an operation flowchart of a partitioning pattern determining process performed by a partitioning pattern determining unit.

FIG. 10 is an operation flowchart of a partitioning pattern determining process performed by the partitioning pattern determining unit 22. In step S301, the partitioning pattern determining unit 22 determines whether the block of interest includes the picture edge. The first block of interest is the CTU to be decoded.

When the block of interest includes the picture edge (YES in step S301), in step S302, the partitioning pattern determining unit 22 determines whether the block of interest includes both the right picture edge and the bottom picture edge.

When the block of interest includes both the right picture edge and the bottom picture edge (YES in step S302), in step S303, the partitioning pattern determining unit 22 partitions the block of interest into four in accordance with the quadtree structure. When the block of interest includes either the right picture edge or the bottom picture edge (NO in step S302), in step S304, the partitioning pattern determining unit 22 determines whether a block including the block of interest has been partitioned into two.

When the block including the block of interest has been partitioned into two (YES in step S304), in step S305, the partitioning pattern determining unit 22 partitions the block of interest into two sub-blocks. At this time, the partitioning pattern determining unit 22 may partition the block of interest along the same direction as the partitioning direction of the block including the block of interest.

When the block including the block of interest has not been partitioned into two (NO in step S304), in step S306, the partitioning pattern determining unit 22 partitions the block of interest in accordance with the structure indicated by the syntax among the quadtree structure and the binary tree structure.

In step S307, after step S303, S305, or S306, the partitioning pattern determining unit 22 sets each of the sub-blocks obtained by partitioning the block of interest, as the block of interest. The partitioning pattern determining unit 22 performs the process as of step S301 on each block of interest.

In step S301, when the block of interest does not include the picture edge (NO in step S301), in step S308, the partitioning pattern determining unit 22 partitions the block of interest into the CUs in accordance with the partitioning pattern indicated by the syntax. When no block includes the picture edge, the partitioning pattern determining unit 22 ends the partitioning pattern determining process.

The partitioning pattern determining unit 22 notifies the prediction block generator 23 of the information indicating each CU included in the CTU to be decoded.

For each CU included in the CTU to be decoded, the prediction block generator 23 generates the prediction block of each PU included in the CU by referring to the decoded picture or the decoded region of the picture to be decoded in accordance with the encoding mode and the PU partitioning pattern that have been applied. At this time, the prediction block generator 23 also decodes the moving vector from, for example, the information indicating the vector mode that has been applied and the prediction error signal of the moving vector.

The prediction block generator 23 generates the prediction block for each PU of the CTU to be decoded in accordance with the encoding mode to be applied to the PU in a manner similar to the prediction block generator 13 of the moving image encoding device 1. That is, the prediction block generator 23 determines an area referenced by a decoded reference picture or the picture to be decoded in accordance with the encoded mode decoded by entropy decoding and generates the prediction block for each PU based on the determined area. At this time, when the PU to be decoded is encoded by the inter prediction encoding method, the prediction block generator 23 may determine the area referenced by the decoded reference picture using the motion vector decoded for the PU. When the PU to be decoded is encoded by the intra prediction encoding method, the prediction block generator 23 may determine the area referenced by the picture to be decoded in accordance with the decoded prediction mode.

The prediction block generator 23 outputs the generated prediction block to the decoder 24.

The decoder 24 performs the inverse quantization by multiplying a predetermined number corresponding to the quantization width determined by the quantization parameter obtained from the decoded header information to the quantization coefficients of each TU received from the entropy decoder 21. The inverse quantization restores the orthogonal transformation coefficients of each TU. Subsequently, the decoder 24 performs an inverse orthogonal transformation process on the orthogonal transformation coefficients for each TU. By performing the inverse quantization process and the inverse orthogonal transformation process on the quantization coefficients of each TU, the prediction error signal of each pixel in the whole CTU is reproduced.

The decoder 24 can decode the PU by adding a value of each pixel of the prediction block of the PU and the reproduced prediction error signal corresponding to the pixel. The decoder 24 decodes the CTU by combining the decoded PUs in accordance with the encoding order. The decoder 24 stores the decoded CTU in the storage unit 25. The decoder 24 decodes the entire picture by combining the decoded CTUs in accordance with the encoding order. The decoder 24 stores the decoded picture in the storage unit 25 and stores the decoded picture in the buffer memory. Each decoded picture stored in the buffer memory is output to a display device (which is not illustrated) in accordance with a display order by a controller (which is not illustrated).

The storage unit 25 temporarily stores the decoded CTU and the decoded picture received from the decoder 24. The storage unit 25 supplies the prediction block generator 23 with the CTU as the reference area or with the picture as the reference picture. The storage unit 25 stores a predetermined number of pictures and discards pictures in the order from the older encoding time when the amount of the stored data exceeds the amount corresponding to the predetermined number of pictures.

Figure 11:
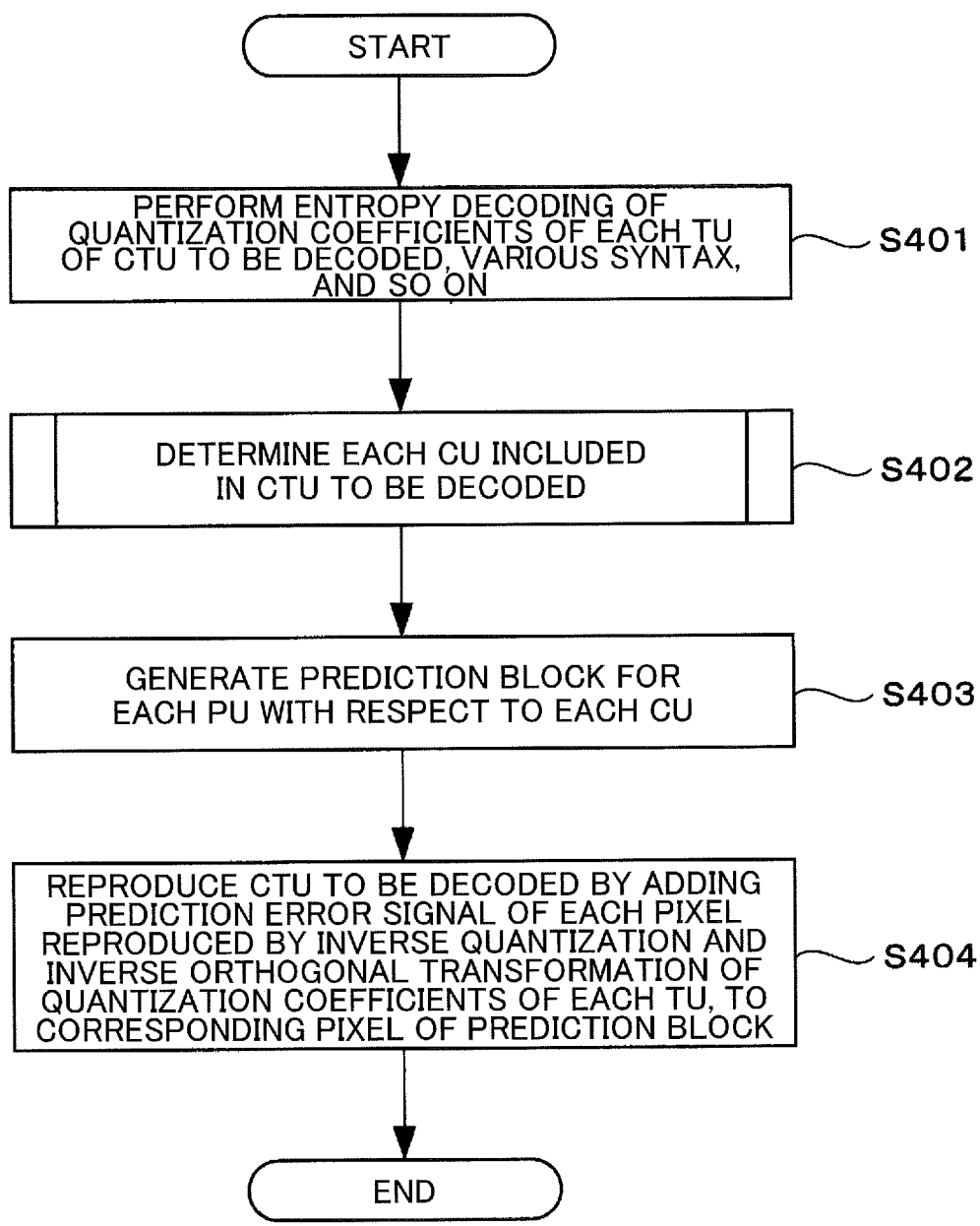
FIG. 11 is an operation flowchart of a moving image decoding process.

FIG. 11 is an operation flowchart of a moving image decoding process performed by the moving image decoding device 2. The moving image decoding device 2 performs the moving image decoding process illustrated in FIG. 11 for each CTU to be decoded. The entropy decoder 21 performs entropy decoding of the data encoded in each CTU. In step S401, the entropy decoder 21 decodes the quantization coefficients, various syntax of each TU of the CTU to be decoded, and so on.

In step S402, the partitioning pattern determining unit 22 determines each CU included in the CTU to be decoded. At this time, the partitioning pattern determining unit 22 may determine each CU in accordance with the flowchart illustrated in FIG. 10.

In step S403, the prediction block generator 23 generates the prediction block for each CU of the CTU to be decoded by referring to the encoding mode applied to each PU included in the CU.

The decoder 24 performs the inverse quantization by multiplying a predetermined number corresponding to the quantization width determined by the quantization parameter obtained from the header information included in the encoding bit stream to the quantization coefficients received from the entropy decoder 21. The decoder 24 reproduces the prediction error signal of each pixel of the CTU to be decoded by performing the inverse orthogonal transformation on the orthogonal transformation signal for each TU. Subsequently, in step S404, the decoder 24 reproduces the CTU to be decoded by adding each pixel value of the prediction block and the reproduced prediction error signal of a corresponding pixel. The decoder 24 stores the reproduced CTU in the storage unit 25. The moving image decoding device 2 ends the moving image decoding process for the CTU to be decoded.

As described above, the moving image decoding device can decode the encoded moving image data even if the binary structure is applied to the block including the picture edge by the moving image encoding device according to the above-described embodiment.

According to a modified embodiment, the encoding mode determining unit 12 of the moving image encoding device 1 may also generate syntax indicating the partitioning direction for a block partitioned into two in accordance with the binary tree structure. The entropy encoder 17 may add the syntax indicating the partitioning direction to the encoded moving image data for each block partitioned into two in accordance with the binary tree structure. This explicitly transmits the partitioning direction to the moving image decoding device 2 with respect to the block partitioned into two in accordance with the binary tree structure. Therefore, by referring to the syntax indicating the partitioning direction that is decoded by the entropy decoder 21, the partitioning pattern determining unit 22 of the moving image decoding device 2 may partition a block, to which the syntax indicating that the binary tree structure has been applied is added, into two along the partitioning direction.

According to another modified embodiment, the prediction block may be generated for each CU. Alternatively, the orthogonal transformation may be performed for each CU. In this case, the encoding mode determining unit 12 of the moving image encoding device 1 does not need to obtain the PU partitioning pattern or the TU partitioning pattern.

Alternatively, it may not be required to determine whether the picture edge is included with respect to the CU. In this case, the encoding mode determining unit 12 of the moving image encoding device 1 may determine the partitioning pattern for the PU including the picture edge in a manner similar to the CU in the above-described embodiment. Similarly, the encoding mode determining unit 12 may determine the partitioning pattern for the TU including the picture edge in a manner similar to the CU in the above-described embodiment. In this case, the partitioning pattern determining unit 22 of the moving image decoding device 2 may determine the partitioning pattern in a manner similar to the above-described embodiment when the CTU to be decoded is partitioned by the PUs or the TUs.

According to another modified embodiment, the CTU that does not include the picture edge may also be recursively partitioned into two in accordance with the binary tree structure. In this case, the encoding mode determining unit 12 of the moving image encoding device 1 may calculate the encoding cost of the CTU of interest or the respective sub-blocks obtained by partitioning the CTU of interest when the CTU is partitioned into four sub-blocks in accordance with the quadtree structure and when the CTU is partitioned into two sub-blocks in accordance with the binary tree structure. The encoding mode determining unit 12 may then determine whether the quadtree structure is to be applied or the binary tree structure is to be applied so as to minimize the encoding cost. In this case, the encoding mode determining unit 12 generates the syntax indicating the structure that has been applied among the quadtree structure and the binary tree structure for the CTU of interest or respective sub-blocks obtained by recursively partitioning the CTU of interest. Furthermore, the encoding mode determining unit 12 generates the syntax indicating the partitioning direction for the CTU or the sub-blocks to which the binary tree structure is applied. The entropy encoder 17 of the moving image encoding device 1 includes the syntax indicating the structure that has been applied and the syntax indicating the partitioning direction in the encoded moving image data. Further, the partitioning pattern determining unit 22 of the moving image decoding device 2 may determine the CU partitioning pattern of the CTU to be decoded by referring to the syntax indicating the structure that has been applied and the syntax indicating the partitioning direction.

Figure 12:
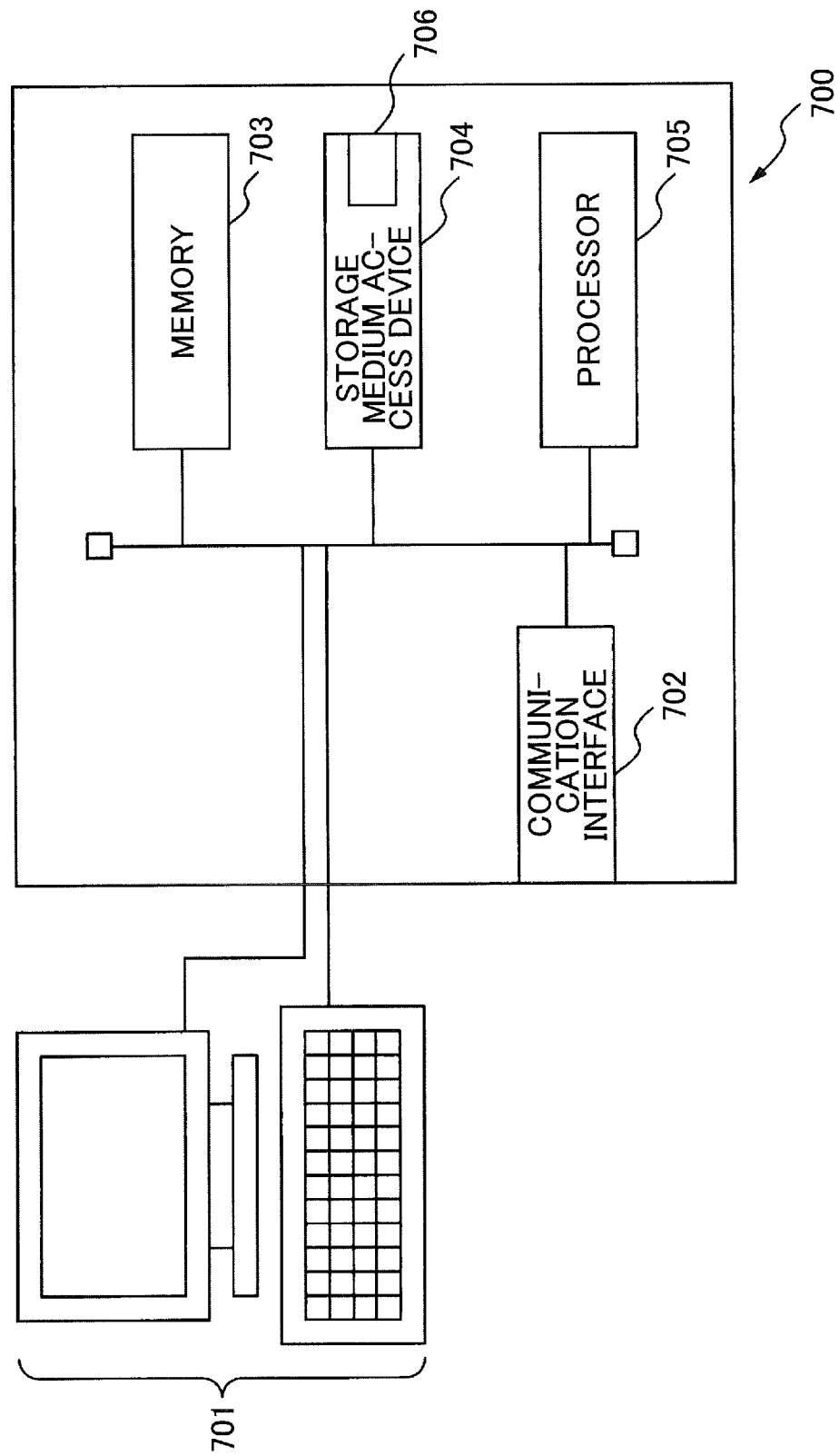
FIG. 12 is a block diagram of a computer operating as the moving image encoding device or the moving image decoding device by executing a computer program that implements a function of each part of the moving image encoding device or the moving image decoding device according to the embodiment or a modified embodiment.

FIG. 12 is a block diagram of a computer operating as the moving image encoding device or the moving image decoding device by executing a computer program that implements a function of each part of the moving image encoding device or the moving image decoding device according to the above-described embodiment or a modified embodiment.

A computer 700 includes a user interface 701, a communication interface 702, a memory 703, a storage medium access device 704, and a processor 705. The processor 705 is connected to the user interface 701, the communication interface 702, the memory 703, and the storage medium access device 704 through a bus for example.

The user interface 701 includes, for example, an input device such as a keyboard and a mouse, and a display device such as a liquid crystal display. Alternatively, the user interface 701 may include an integrated input and display device, such as a touch panel display. The user interface 701, for example, outputs an operation signal that selects the moving image data to be encoded or the moving image data to be decoded to the processor 705 in response to the operation of the user. The moving image data to be encoded or the moving image data to be decoded may be determined by an application program running on the processor 705.

The communication interface 702 includes a communication interface and a control circuit for connecting to a communication network in accordance with a communication standard, such as Ethernet (registered trademark). The communication interface 702 obtains the moving image data to be encoded from another device connected to the communication network and passes the moving image data to be encoded to the processor 705. The communication interface 702 may also output the encoded moving image data received from the processor 705 to another device through the communication network. The communication interface 702 may also obtain a bit stream including the encoded moving image data to be decoded from another device connected to the communication network and may pass the bit stream to the processor 705.

The memory 703 is an example of a storage unit, and includes, for example, a readable and writable semiconductor memory and a read-only semiconductor memory. The memory 703 stores the computer program for executing the moving image encoding process or the computer program for executing the moving image decoding process that is executed on the processor 705. Further, the memory 703 stores data generated during or as a result of the moving image encoding process or the moving image decoding process.

The storage medium access device 704 is another example of the storage unit, and is a device that accesses the storage medium 706, such as a magnetic disk, a semiconductor memory card, and an optical storage medium. The storage medium access device 704, for example, reads the computer program for the moving image encoding process or the computer program for the moving image decoding process that is executed on the processor 705 and that is stored in the storage medium 706, and passes the program to the processor 705.

The processor 705 includes, for example, at least one of a central processing unit (CPU), a graphics processing unit (GPU), and a numeric data processor. The processor 705 encodes the moving image data by executing the computer program for the moving image encoding process according to the embodiment or the modified embodiment described above. The processor 705 then stores the encoded moving image data in the memory 703 or outputs the encoded moving image data to another device through the communication interface 702. Alternatively, the processor 705 decodes the encoded moving image data by executing the computer program for the moving image decoding process according to the embodiment or the modified embodiment described above. The processor 705 then causes the display device of the user interface 701 to display the decoded picture.

The computer program that can execute the function of each part of the moving image encoding device 1 on the processor may be provided in a form recorded in a computer-readable medium. Similarly, the computer program that can execute the function of each part of the moving image decoding device 2 on the processor may be provided in a form recorded in a computer-readable medium. However, such a recording medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A moving image encoding device for encoding a picture to be encoded included in moving image data, the moving image encoding device comprising:
a memory; and
a processor coupled to the memory and configured to
partition a picture edge block into a plurality of sub-blocks so that none of the plurality of sub-blocks include an edge of the picture to be encoded by partitioning the picture edge block into four in accordance with a quadtree structure when the picture edge block includes both a horizontal edge of the picture to be encoded and a vertical edge of the picture to be encoded, by partitioning the picture edge block into two in a direction orthogonal to the edge included in the picture edge block when the picture edge block includes either the horizontal edge of the picture to be encoded or the vertical edge of the picture to be encoded after a block including the picture edge block has been partitioned into two, and by partitioning the picture edge block into four in accordance with the quadtree structure or partitioning the picture edge block into two in the direction orthogonal to the edge included in the picture edge block when the picture edge block includes either the horizontal edge of the picture to be encoded or the vertical edge of the picture to be encoded after the block including the picture edge block has been partitioned into four, the picture edge block being a block including at least either the horizontal edge of the picture to be encoded or the vertical edge of the picture to be encoded among a plurality of blocks obtained by partitioning the picture to be encoded,
generate a prediction block by referring to another encoded picture or an encoded area of the picture to be encoded for each of the plurality of sub-blocks,
calculate a prediction error between a pixel of a given sub-block and a corresponding pixel of the prediction block corresponding to the given sub-block for each of the plurality of sub-blocks, and encode the prediction error, and add partitioning information indicating whether the picture edge block has been partitioned into four or two, to encoded moving image data.

2. The moving image encoding device as claimed in claim 1, wherein when a first sub-block among the plurality of sub-blocks obtained by partitioning the picture edge block includes either the horizontal edge of the picture to be encoded or the vertical edge of the picture to be encoded, the processor further partitions the first sub-block into four in accordance with the quadtree structure, or into two in the direction orthogonal to the edge included in the first sub-block, and wherein the processor adds information indicating whether the first sub-block has been partitioned into four or into two, to the encoded moving image data.

3. The moving image encoding device as claimed in claim 2, wherein when a second sub-block obtained by partitioning the first sub-block into two includes either the horizontal edge of the picture to be encoded or the vertical edge of the picture to be encoded, the processor further partitions the second sub-block into two in a same direction as a direction in which the first sub-block has been partitioned.

4. The moving image encoding device as claimed in claim 1, wherein when the picture edge block has been partitioned into two, the processor adds information indicating a direction in which the picture edge block has been partitioned, to the encoded moving image data.

5. A moving image decoding device for decoding a picture to be decoded included in encoded moving image data, the moving image decoding device comprising:
a memory; and
a processor coupled to the memory and configured to
partition a picture edge block into a plurality of sub-blocks so that none of the plurality of sub-blocks include an edge of the picture to be decoded by partitioning the picture edge block into four in accordance with a quadtree structure when the picture edge block includes both a horizontal edge of the picture to be decoded and a vertical edge of the picture to be decoded, by partitioning the picture edge block into two in a direction orthogonal to the edge included in the picture edge block when the picture edge block includes either the horizontal edge of the picture to be decoded or the vertical edge of the picture to be decoded after a block including the picture edge block has been partitioned into two, and by partitioning the picture edge block into four in accordance with the quadtree structure or partitioning the picture edge block into two in the direction orthogonal to the edge included in the picture edge block by referring to partitioning information that is included in the encoded moving image data and that indicates whether the picture edge block has been partitioned into four in accordance with the quadtree structure or has been partitioned into two when the picture edge block includes either the horizontal edge of the picture to be decoded or the vertical edge of the picture to be decoded after the block including the picture edge block has been partitioned into four, the picture edge block being a block including at least either the horizontal edge of the picture to be decoded or the vertical edge of the picture to be decoded among a plurality of blocks obtained by partitioning the picture to be decoded,
generate a prediction block by referring to another decoded picture or a decoded area of the picture to be decoded for each of the plurality of sub-blocks, and
decode the picture edge block by adding a prediction error between a pixel of a given sub-block included in the encoded moving image data and a corresponding pixel of the prediction block corresponding to the given sub-block, and a value of the corresponding pixel of the prediction block, for each of the plurality of sub-blocks.

6. The moving image decoding device as claimed in claim 5, wherein when the picture edge block has been partitioned into two and a first sub-block among the plurality of sub-blocks obtained by partitioning the picture edge block includes either the horizontal edge of the picture to be decoded or the vertical edge of the picture to be decoded, the processor further partitions the first sub-block into two in a direction orthogonal to the edge included in the first sub-block.

7. A moving image encoding method for encoding a picture to be encoded included in moving image data, the moving image encoding method comprising:
partitioning a picture edge block into a plurality of sub-blocks so that none of the plurality of sub-blocks include an edge of the picture to be encoded by partitioning the picture edge block into four in accordance with a quadtree structure when the picture edge block includes both a horizontal edge of the picture to be encoded and a vertical edge of the picture to be encoded, by partitioning the picture edge block into two in a direction orthogonal to the edge included in the picture edge block when the picture edge block includes either the horizontal edge of the picture to be encoded or the vertical edge of the picture to be encoded after a block including the picture edge block has been partitioned into two, and by partitioning the picture edge block into four in accordance with the quadtree structure or partitioning the picture edge block into two in the direction orthogonal to the edge included in the picture edge block when the picture edge block includes either the horizontal edge of the picture to be encoded or the vertical edge of the picture to be encoded after the block including the picture edge block has been partitioned into four, the picture edge block being a block including at least either the horizontal edge of the picture to be encoded or the vertical edge of the picture to be encoded among a plurality of blocks obtained by partitioning the picture to be encoded;
generating a prediction block by referring to another encoded picture or an encoded area of the picture to be encoded for each of the plurality of sub-blocks;
calculating a prediction error between a pixel of a given sub-block and a corresponding pixel of the prediction block corresponding to the given sub-block for each of the plurality of sub-blocks, and encoding the prediction error; and
adding partitioning information indicating whether the picture edge block has been partitioned into four or two, to encoded moving image data.

8. A moving image decoding method for decoding a picture to be decoded included in encoded moving image data, the moving image decoding method comprising:
partitioning a picture edge block into a plurality of sub-blocks so that none of the plurality of sub-blocks include an edge of the picture to be decoded by partitioning the picture edge block into four in accordance with a quadtree structure when the picture edge block includes both a horizontal edge of the picture to be decoded and a vertical edge of the picture to be decoded, by partitioning the picture edge block into two in a direction orthogonal to the edge included in the picture edge block when the picture edge block includes either the horizontal edge of the picture to be decoded or the vertical edge of the picture to be decoded after a block including the picture edge block has been partitioned into two, and by partitioning the picture edge block into four in accordance with the quadtree structure or partitioning the picture edge block into two in the direction orthogonal to the edge included in the picture edge block by referring to partitioning information that is included in the encoded moving image data and that indicates whether the picture edge block has been partitioned into four in accordance with the quadtree structure or has been partitioned into two when the picture edge block includes either the horizontal edge of the picture to be decoded or the vertical edge of the picture to be decoded after the block including the picture edge block has been partitioned into four, the picture edge block being a block including at least either the horizontal edge of the picture to be decoded or the vertical edge of the picture to be decoded among a plurality of blocks obtained by partitioning the picture to be decoded;

generating a prediction block by referring to another decoded picture or a decoded area of the picture to be decoded for each of the plurality of sub-blocks; and decoding the picture edge block by adding a prediction error between a pixel of a given sub-block included in the encoded moving image data and a corresponding pixel of the prediction block corresponding to the given sub-block, and a value of the corresponding pixel of the prediction block, for each of the plurality of sub-blocks.

* * * * *